(12) United States Patent
Huang et al.

(10) Patent No.: US 12,439,413 B2
(45) Date of Patent: Oct. 7, 2025

(54) MULTIPLEXING HYBRID AUTOMATIC REPEAT REQUEST ACKNOWLEDGEMENT AND SCHEDULING REQUEST WITH DIFFERENT PRIORITIES AND PHYSICAL UPLINK CONTROL CHANNEL FORMATS

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 17/658,911

(22) Filed: Apr. 12, 2022

(65) Prior Publication Data
US 2023/0123479 A1    Apr. 20, 2023

Related U.S. Application Data

(60) Provisional application No. 63/262,538, filed on Oct. 14, 2021.

(51) Int. Cl.
*H04W 72/23*    (2023.01)
*H04L 1/1829*   (2023.01)
*H04W 72/566*   (2023.01)

(52) U.S. Cl.
CPC ........... *H04W 72/23* (2023.01); *H04L 1/1854* (2013.01); *H04W 72/569* (2023.01)

(58) Field of Classification Search
CPC .... H04W 72/23; H04W 72/569; H04L 1/1854
See application file for complete search history.

(56) References Cited

U.S. PATENT DOCUMENTS

| | | | |
|---|---|---|---|
| 2019/0261361 A1* | 8/2019 | Xiong | H04W 72/02 |
| 2023/0164774 A1* | 5/2023 | Fröberg Olsson | H04L 1/1861 370/329 |
| 2024/0063951 A1* | 2/2024 | Yin | H04L 1/1861 |
| 2024/0146466 A1* | 5/2024 | Yin | H04L 1/1671 |

* cited by examiner

*Primary Examiner* — Ricky Q Ngo
*Assistant Examiner* — Stephen N Steiner
(74) *Attorney, Agent, or Firm* — Harrity & Harrity, LLP

(57) ABSTRACT

Various aspects of the present disclosure generally relate to wireless communication. In some aspects, a user equipment (UE) may append one or more bits of a scheduling request (SR), having a first priority and in a first physical uplink control channel (PUCCH) resource associated with a first format, to one or more bits of a hybrid automatic repeat request acknowledgement (HARQ-ACK), having a second priority and in a second PUCCH resource associated with a second format, to form a multiplexed SR and HARQ-ACK. The UE may select a PUCCH resource, from a plurality of high priority PUCCH resources, based at least in part on a payload size of the multiplexed SR and HARQ-ACK. The UE may transmit, to a network node, the multiplexed SR and HARQ-ACK using the selected PUCCH resource. Numerous other aspects are described.

30 Claims, 11 Drawing Sheets

500 ⟶

| | HARQ ACK: PF 0, LP | HARQ ACK: PF 1, LP | HARQ ACK: PF 0, HP | HARQ ACK: PF 1, HP |
|---|---|---|---|---|
| SR: PF 0, LP | Multiplex on HARQ ACK resource | Drop SR resource | Multiplex on HARQ ACK resource, apply a power boost to the transmission | Drop SR resource |
| SR: PF 1, LP | Multiplex on HARQ ACK resource | RB selection | Multiplex on HARQ ACK resource, apply a power boost to the transmission | RB selection. If SR is positive, use power control parameter for HARQ ACK resource |
| SR: PF 0, HP | Option 1 – Multiplex on HARQ ACK resource, use power control parameter of SR resource. Option 2 – Multiplex on SR resource | Perform RB selection. If SR is negative, transmit HARQ-ACK on the HARQ-ACK resource. Otherwise, transmit HARQ-ACK on the SR resource | Multiplex on HARQ ACK resource | Drop SR resource |
| SR: PF 1, HP | Perform RB selection. If SR is negative, transmit HARQ-ACK on HARQ-ACK resource. If SR is positive, transmit HARQ-ACK on SR resource | RB selection | Multiplex on HARQ ACK resource | RB selection |

| PUCCH format | Length in #OFDM symbols | #UCI bits | Waveform | Description |
|---|---|---|---|---|
| 0 | 1 - 2 | ≤ 3 | CGS seq | Short PUCCH format with 1-2 bits UCI |
| 1 | 4 - 14 | ≤ 2 | CGS seq | Long PUCCH format with 1-2 bits UCI (TD-OCC) |
| 2 | 1 - 2 | > 2 | OFDM | Short PUCCH format with >2 bits UCI |
| 3 | 4 - 14 | > 2 | DFT-S-OFDM | Long PUCCH format with > 2-bits UCI and no multiplexing capability |
| 4 | 4 - 14 | > 2 | DFT-S-OFDM | Long PUCCH format with > 2-bits UCI and multiplexing capability |

FIG. 3

| | HARQ ACK: PF 0, LP | HARQ ACK: PF 1, LP | HARQ ACK: PF 0, HP | HARQ ACK: PF 1, HP |
|---|---|---|---|---|
| SR: PF 0, LP | Multiplex on HARQ ACK resource | Drop SR resource | Multiplex on HARQ ACK resource, apply a power boost to the transmission | Drop SR resource |
| SR: PF 1, LP | Multiplex on HARQ ACK resource | RB selection | Multiplex on HARQ ACK resource, apply a power boost to the transmission | RB selection. If SR is positive, use power control parameter for HARQ ACK resource |
| SR: PF 0, HP | Option 1 – Multiplex on HARQ ACK resource, use power control parameter of SR resource. Option 2 – Multiplex on the SR resource | Perform RB selection. If SR is negative, transmit HARQ-ACK on the HARQ-ACK resource. Otherwise, transmit HARQ-ACK on the SR resource | Multiplex on HARQ ACK resource | Drop SR resource |
| SR: PF 1, HP | Perform RB selection. If SR is negative, transmit HARQ-ACK on HARQ-ACK resource. If SR is positive, transmit HARQ-ACK on SR resource | RB selection | Multiplex on HARQ ACK resource | RB selection |

FIG. 5

MULTIPLEXING HYBRID AUTOMATIC REPEAT REQUEST ACKNOWLEDGEMENT AND SCHEDULING REQUEST WITH DIFFERENT PRIORITIES AND PHYSICAL UPLINK CONTROL CHANNEL FORMATS

CROSS-REFERENCE TO RELATED APPLICATION

This Patent application claims priority to U.S. Provisional Patent Application No. 63/262,538, filed on Oct. 14, 2021, entitled "MULTIPLEXING HYBRID AUTOMATIC REPEAT REQUEST ACKNOWLEDGEMENT AND SCHEDULING REQUEST WITH DIFFERENT PRIORITIES AND PHYSICAL UPLINK CONTROL CHANNEL FORMATS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multiplexing hybrid automatic repeat request acknowledgement and scheduling request with different priorities and physical uplink control channel formats.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include appending one or more bits of a scheduling request (SR), having a first priority and in a first physical uplink control channel (PUCCH) resource associated with a first format, to one of more bits of a hybrid automatic repeat request acknowledgement (HARQ-ACK), having a second priority and in a second PUCCH resource associated with a second format, to form a multiplexed SR and HARQ-ACK. The method may include selecting a PUCCH resource, from a plurality of high priority PUCCH resources, based at least in part on a payload size of the multiplexed SR and HARQ-ACK. The method may include transmitting, to a network node, the multiplexed SR and HARQ-ACK using the selected PUCCH resource.

Some aspects described herein relate to a method of wireless communication performed by a network node. The method may include transmitting, to a UE, downlink information indicating one or more rules for selecting a PUCCH resource for transmitting a multiplexed SR and HARQ-ACK, the one or more rules indicating to select the PUCCH resource, from a plurality of high priority PUCCH resources, based at least in part on a payload size of the multiplexed SR and HARQ-ACK. The method may include receiving, from the UE and based at least in part on the downlink information, the multiplexed SR and HARQ-ACK.

Some aspects described herein relate to an apparatus for wireless communication performed by a UE. The apparatus may include a memory and one or more processors, coupled to the memory. The one or more processors may be configured to append one or more bits of an SR, having a first priority and in a first PUCCH resource associated with a first format, to one of more bits of a HARQ-ACK, having a second priority and in a second PUCCH resource associated with a second format, to form a multiplexed SR and HARQ-ACK. The one or more processors may be configured to select a PUCCH resource, from a plurality of high priority PUCCH resources, based at least in part on a payload size of the multiplexed SR and HARQ-ACK. The one or more processors may be configured to transmit, to a network node, the multiplexed SR and HARQ-ACK using the selected PUCCH resource.

Some aspects described herein relate to an apparatus for wireless communication performed by a network node. The apparatus may include a memory and one or more processors, coupled to the memory. The one or more processors may be configured to transmit, to a UE, downlink information indicating one or more rules for selecting a PUCCH resource for transmitting a multiplexed SR and HARQ-ACK, the one or more rules indicating to select the PUCCH resource, from a plurality of high priority PUCCH resources, based at least in part on a payload size of the multiplexed SR and HARQ-ACK. The one or more processors may be configured to receive, from the UE and based at least in part on the downlink information, the multiplexed SR and HARQ-ACK.

Some aspects described herein relate to an apparatus for wireless communication. The apparatus may include means for appending one or more bits of an SR, having a first priority and in a first PUCCH resource associated with a first format, to one of more bits of a HARQ-ACK, having a second priority and in a second PUCCH resource associated with a second format, to form a multiplexed SR and HARQ-ACK. The apparatus may include means for selecting a PUCCH resource, from a plurality of high priority PUCCH resources, based at least in part on a payload size of the multiplexed SR and HARQ-ACK. The apparatus may include means for transmitting, to a network node, the multiplexed SR and HARQ-ACK using the selected PUCCH resource.

Some aspects described herein relate to an apparatus for wireless communication. The apparatus may include means for transmitting, to a UE, downlink information indicating one or more rules for selecting a PUCCH resource for transmitting a multiplexed SR and HARQ-ACK, the one or more rules indicating to select the PUCCH resource, from a plurality of high priority PUCCH resources, based at least in part on a payload size of the multiplexed SR and HARQ-ACK. The apparatus may include means for receiving, from the UE and based at least in part on the downlink information, the multiplexed SR and HARQ-ACK.

Some aspects described herein relate to a non-transitory computer-readable medium that stores a set of instructions for wireless communication by a UE. The set of instructions, when executed by one or more processors of the UE, may cause the UE to append one or more bits of an SR, having a first priority and in a first PUCCH resource associated with a first format, to one of more bits of a HARQ-ACK, having a second priority and in a second PUCCH resource associated with a second format, to form a multiplexed SR and HARQ-ACK. The set of instructions, when executed by one or more processors of the UE, may cause the UE to select a PUCCH resource, from a plurality of high priority PUCCH resources, based at least in part on a payload size of the multiplexed SR and HARQ-ACK. The set of instructions, when executed by one or more processors of the UE, may cause the UE to transmit, to a network node, the multiplexed SR and HARQ-ACK using the selected PUCCH resource.

Some aspects described herein relate to a non-transitory computer-readable medium that stores a set of instructions for wireless communication by a network node. The set of instructions, when executed by one or more processors of the network node, may cause the network node to transmit, to a UE, downlink information indicating one or more rules for selecting a PUCCH resource for transmitting a multiplexed SR and HARQ-ACK, the one or more rules indicating to select the PUCCH resource, from a plurality of high priority PUCCH resources, based at least in part on a payload size of the multiplexed SR and HARQ-ACK. The set of instructions, when executed by one or more processors of the network node, may cause the network node to receive, from the UE and based at least in part on the downlink information, the multiplexed SR and HARQ-ACK.

Aspects generally include a method, apparatus, system, computer program product, non-transitory computer-readable medium, user equipment, base station, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical uplink control channel (PUCCH) resource formats, in accordance with the present disclosure.

FIG. 5 is a diagram illustrating an example of collision avoidance rules, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
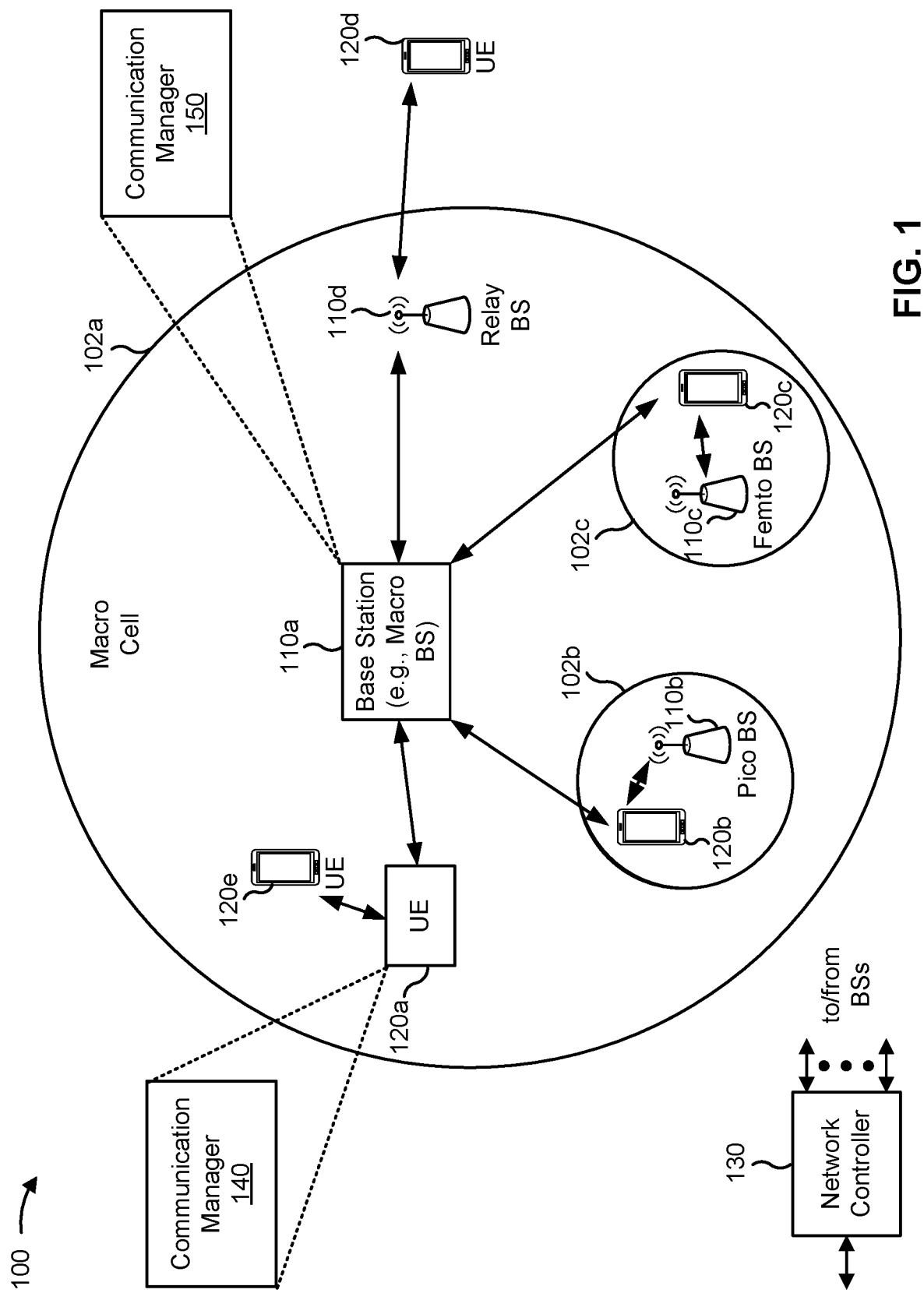
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may append one or more bits of an SR, having a first priority and in a first PUCCH resource associated with a first format, to one of more bits of a HARQ-ACK, having a second priority and in a second PUCCH resource associated with a second format, to form a multiplexed SR and HARQ-ACK; select a PUCCH resource, from a plurality of high priority PUCCH resources, based at least in part on a payload size of the multiplexed SR and HARQ-ACK; and transmit, to a network node, the multiplexed SR and HARQ-ACK using the selected PUCCH resource. Additionally, or alternatively, the communication manager 140 may perform one or more other operations described herein.

In some aspects, a network node (e.g., the base station 110) may include a communication manager 150. As described in more detail elsewhere herein, the communication manager 150 may transmit, to a UE, downlink information indicating one or more rules for selecting a PUCCH resource for transmitting a multiplexed SR and HARQ-ACK, the one or more rules indicating to select the PUCCH resource, from a plurality of high priority PUCCH resources, based at least in part on a payload size of the multiplexed SR and HARQ-ACK; and receive, from the UE and based at least in part on the downlink information, the multiplexed SR and HARQ-ACK. Additionally, or alternatively, the communication manager 150 may perform one or more other operations described herein.

As indicated above, FIG. 1 is provided as an example. Other examples may differ from what is described with regard to FIG. 1.

Figure 2:
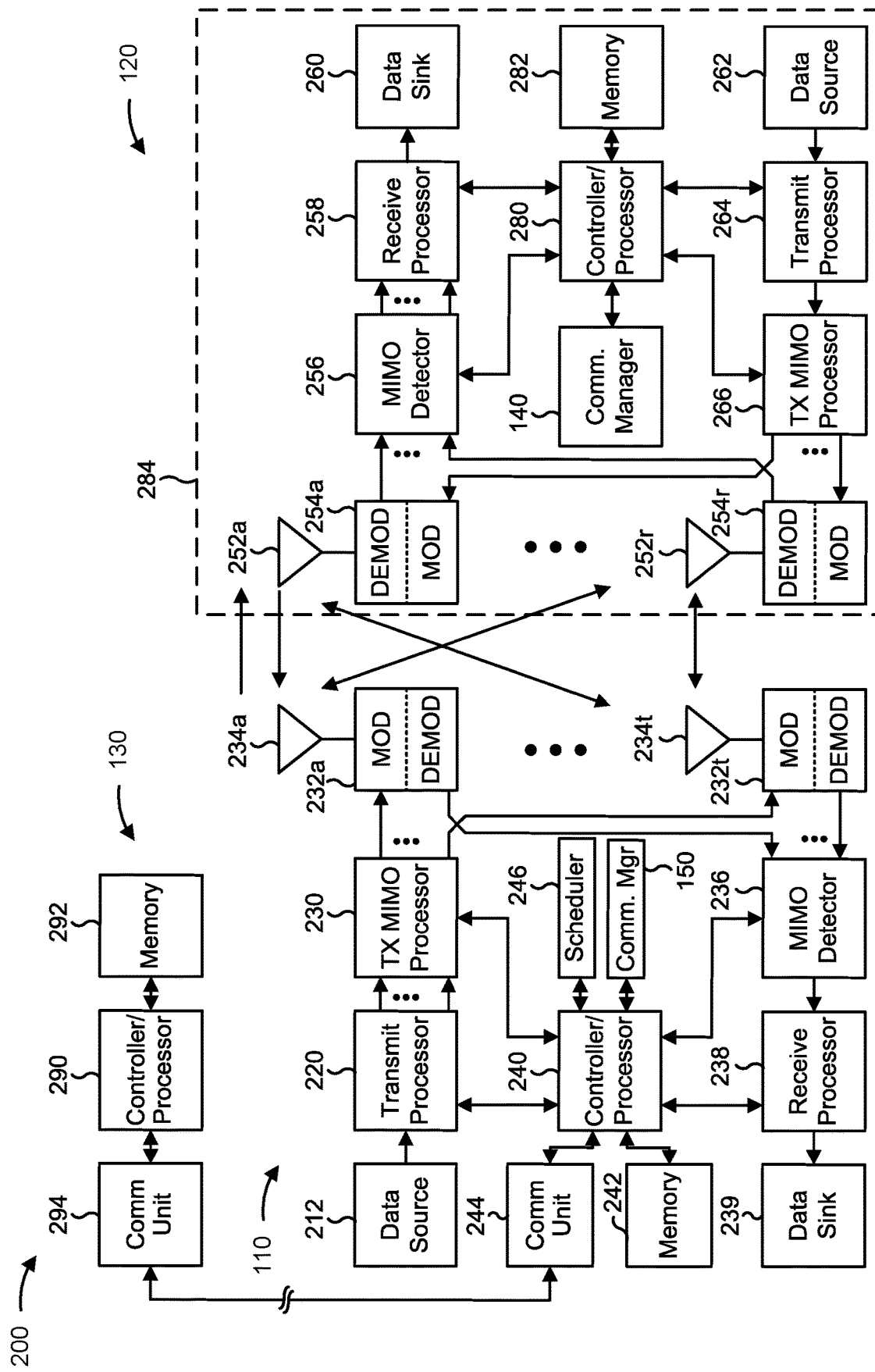
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with multiplexing HARQ-ACK and SR with different priorities and PUCCH formats, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for appending one or more bits of an SR, having a first priority and in a first PUCCH resource associated with a first PUCCH, to one of more bits of a HARQ-ACK, having a second priority and in a second PUCCH resource associated with a second format, to form a multiplexed SR and HARQ-ACK; means for selecting a PUCCH resource, from a plurality of high priority PUCCH resources, based at least in part on a payload size of the multiplexed SR and HARQ-ACK; and/or means for transmitting, to a network node, the multiplexed SR and HARQ-ACK using the selected PUCCH resource. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, to a UE, downlink information indicating one or more rules for selecting a PUCCH resource for transmitting a multiplexed SR and HARQ-ACK, the one or more rules indicating to select the PUCCH resource, from a plurality of high priority PUCCH resources, based at least in part on a payload size of the multiplexed SR and HARQ-ACK; and/or means for receiving, from the UE and based at least in part on the downlink information, the multiplexed SR and HARQ-ACK. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of physical uplink control channel (PUCCH) resource formats, in accordance with the present disclosure. As described in more detail below, a plurality of PUCCH resources may be configured for dynamic acknowledgement/negative acknowledgement (ACK/NACK) feedback, also sometimes called dynamic hybrid automatic repeat request (HARQ) feedback or dynamic HARQ acknowledgment (HARQ-ACK) feedback. For example, a set of one or more resources may be configured for high priority dynamic ACK/NACK feedback, and a (e.g., different) set of one or more resources may be configured for low priority dynamic ACK/NACK feedback. Additionally, or alternatively, a plurality of PUCCH resources may be configured for periodic (e.g., semi-persistent scheduling (SPS)) ACK/NACK feedback. For example, a set of one or more resources may be configured for high priority SPS ACK/NACK feedback and a (e.g., different) set of one or more resources may be configured for low priority SPS ACK/NACK feedback. The set of resources configured for the high priority dynamic ACK/NACK feedback, the set of resources configured for the low priority dynamic ACK/NACK feedback, the set of resources configured for the high priority SPS ACK/NACK feedback, and the set of resources configured for the low priority SPS ACK/NACK feedback, may be associated with any of the PUCCH formats described below.

As shown in the example 300, the PUCCH resources may have any of PUCCH formats 0, 1, 2, 3, or 4. A PUCCH resource having a PUCCH format 0 may have a length of 1 or 2 orthogonal frequency division multiplexing (OFDM) symbols, may have less than or equal to 3 (e.g., 1, 2, or 3) uplink control information (UCI) bits, and may have a computer generated sequence (CGS) waveform. A PUCCH resource having a PUCCH format 1 may have a length of greater than or equal to 4, but less than or equal to 14, OFDM symbols, may have less than or equal to 2 (e.g., 1 or 2) UCI bits, and may have a CGS waveform. A PUCCH resource having a PUCCH format 2 may have a length of 1 or 2 OFDM symbols, may have more than 2 UCI bits, and may have an OFDM waveform. A PUCCH resource having a PUCCH format 3 may have a length of greater than or equal to 4, but less than or equal to 14, OFDM symbols, may have more than 2 UCI bits, may have a DFT-S-OFDM waveform, and may not have a multiplexing capability. A PUCCH resource having a PUCCH format 4 may have a length of greater than or equal to 4, but less than or equal to 14, OFDM symbols, may have more than 2 UCI bits, may have a DFT-S-OFDM waveform, and may have a multiplexing capability. Some techniques and apparatuses described herein assist with multiplexing a HARQ-ACK and an SR with different PUCCH formats, as described in more detail elsewhere herein.

As indicated above, FIG. 3 is provided as an example. Other examples may differ from what is described with regard to FIG. 3.

Figure 4:
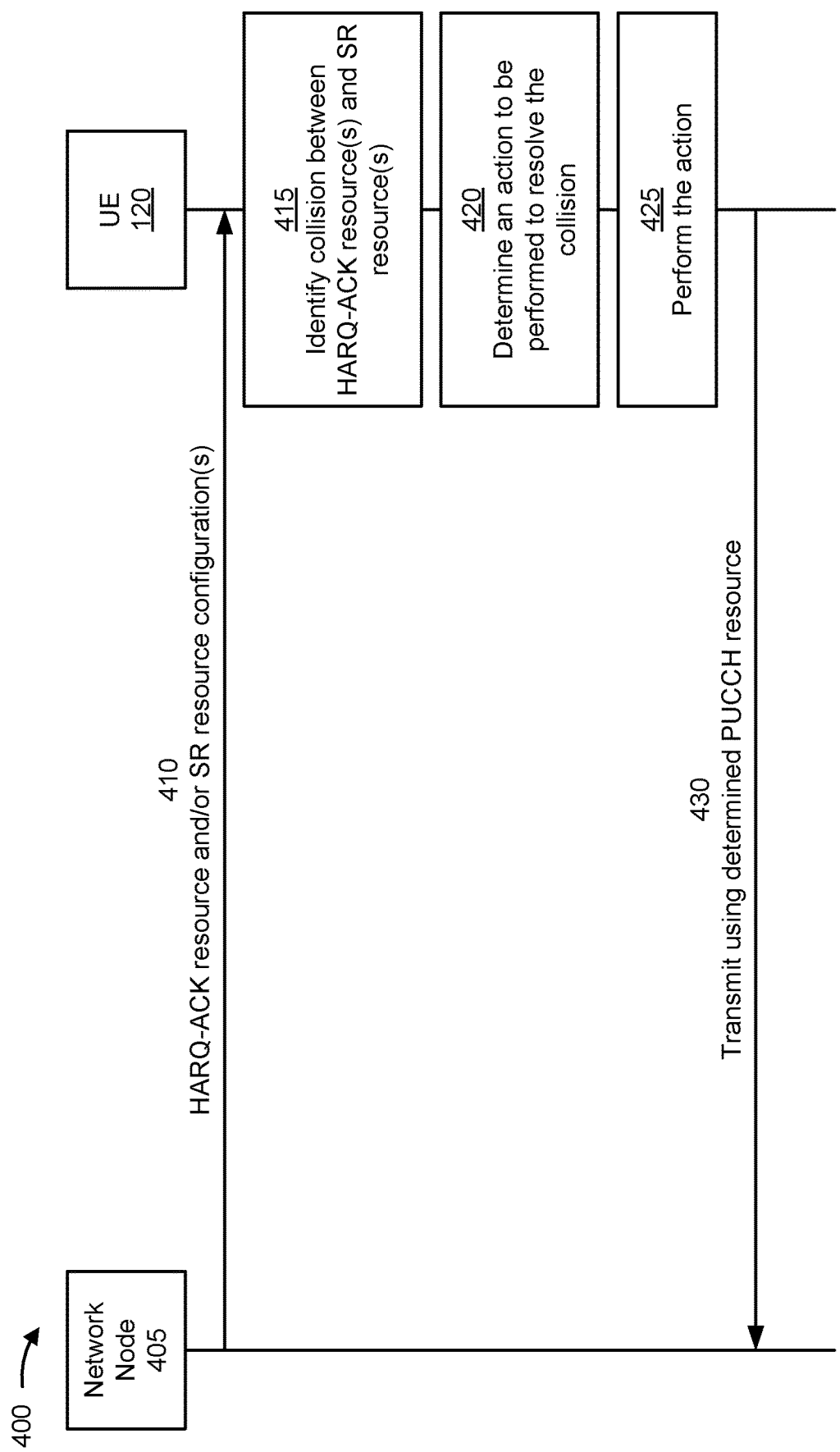
FIG. 4 is a diagram illustrating an example of collision handling between hybrid automatic repeat request acknowledgement (HARQ-ACK) and scheduling request (SR) transmissions, in accordance with the present disclosure.

FIG. 4 is a diagram illustrating an example 400 associated with collision handling between HARQ-ACK and SR transmissions, in accordance with the present disclosure. As shown in FIG. 4, example 400 may include communication between a network node, such as the network node 405, and a UE, such as the UE 120. The network node 405 may include some or all of the features of the BS, CU, DU, and/or RU described herein.

As shown by reference number 410, the network node 405 may transmit, and the UE 120 may receive, one or more HARQ-ACK resource configurations and/or one or more SR resource configurations. For example, the network node 405 may configure the UE 120 with one or more resources (e.g., HARQ-ACK resources) for the UE 120 to transmit ACK/NACK feedback (e.g., HARQ feedback or HARQ-ACK feedback) associated with downlink communications from the UE 120. In some cases, the HARQ-ACK resources may be periodic (e.g., associated with semi-persistent scheduling (SPS) downlink communications for which resources are configured in a radio resource control (RRC) message) or dynamic (e.g., associated with dynamic downlink communications, such as downlink communications for which resources are dynamically scheduled using downlink control information (DCI)). For example, the UE 120 may be configured with one or more periodic HARQ-ACK resources and/or one or more dynamic HARQ-ACK resources (e.g., an offset from DCI for transmission of a dynamic HARQ-ACK resource). Similarly, the network node 405 may configure the UE 120 with one or more resources (e.g., SR resources) for the UE 120 to transmit SRs to the network node 405. In some cases, a resource may be referred to as an occasion. For example, an SR resource may be referred to as an SR occasion (e.g., an opportunity for the UE 120 to transmit an SR).

In some cases, the UE 120 may be configured to report HARQ-ACK feedback using a HARQ-ACK codebook. In some aspects, the HARQ-ACK codebook may be a Type 1 HARQ-ACK codebook. The Type 1 HARQ-ACK codebook, also referred to as a static HARQ-ACK codebook, may be a codebook in which the number of ACK/NACK bits reported by the UE is fixed across different PUCCH resources. In some aspects, the HARQ-ACK codebook may be a Type 2 HARQ-ACK codebook. In the Type 2 HARQ-ACK codebook, also referred to as a dynamic HARQ-ACK codebook, the number of ACK/NACK bits reported by the UE may vary across different PUCCH resources in which HARQ-ACK feedback is reported. To permit the UE 120 to construct a Type 2 HARQ-ACK codebook, the network node 405 may transmit a downlink association index (DAI) value (e.g., a cumulative DAI value and/or a total DAI value) in DCI. The DAI value may be incremented in each subsequent DCI, which indicates a count for the number of ACK/NACK bits to be indicated in a PUCCH resource and a position of each ACK/NACK bit corresponding to each physical downlink shared channel (PDSCH) communication.

As shown by reference number 415, the UE 120 may identify a collision between one or more HARQ-ACK resources and one or more SR resources having different priorities (e.g., where at least one resource has a different priority than the other resource(s) associated with the collision). As described above, "collision" may refer to an overlap between two or more resources (e.g., HARQ-ACK resource(s) and/or SR resource(s)), such as an overlap in the time domain.

As shown by reference number 420, the UE 120 may determine an action to be performed to resolve the collision. For example, the UE 120 may determine an action associated with at least one of the one or more HARQ-ACK resources or the one or more SR resources based at least in part on at least one of a PUCCH format or a priority associated with at least one of the one or more HARQ-ACK resources, or a PUCCH format or a priority associated with at least one of the one or more SR resources. Determining the action may include determining a PUCCH resource for transmitting the HARQ-ACK and SR.

As shown by reference numbers 425 and 430, the UE 120 may perform the action. For example, the UE 120 may transmit, to the network node 405, the HARQ-ACK and SR using the PUCCH resource, such as the PUCCH resource determined in step 415.

In some cases, the UE 120 may determine the action based at least in part on one or more rules (e.g., collision avoidance rules). For example, the network node 405 may determine a set of rules to be followed by the UE 120 to resolve collisions between HARQ-ACK resource(s) and SR resource(s) having different priorities. The network node 405 may transmit, and the UE 120 may receive, the set of rules. In some cases, the collision avoidance rules may be configured in the UE 120, or may be received from a device other than the network node 405. An example set of collision avoidance rules is described below in connection with FIG. 5. These rules may be different for different priority combinations and/or PUCCH formats, which creates complexity and consumes excess processing resources.

As indicated above, FIG. 4 is provided as an example. Other examples may differ from what is described with regard to FIG. 4.

FIG. 5 is a diagram illustrating an example 500 of collision avoidance rules, in accordance with the present disclosure. FIG. 5 depicts an example set of rules (e.g., collision avoidance rules) associated with resolving collisions between a HARQ-ACK resource and an SR resource. For example, the table depicted in FIG. 5 may provide rules for resolving a collision between a HARQ-ACK resource associated with a first priority and an SR resource associated with a second priority (e.g., that is different from the first priority).

The rules described herein in connection with FIG. 5 are provided merely as examples. The UE 120 may follow one or more (or a combination of) the following rules to resolve a collision between one or more HARQ-ACK resource and one or more SR resources. In some cases, the UE 120 may follow one or more (or a combination of) the following rules as a part of an action to resolve a collision between one or more HARQ-ACK resource and one or more SR resources (e.g., the UE 120 may perform one or more additional actions in combination with following one or more of the following rules to resolve a collision).

In some cases, if a HARQ-ACK resource associated with a PUCCH format (shown as PF) 0 and a low priority (shown as LP) collides with a low priority SR resource (e.g., associated with PUCCH format 0 or PUCCH format 1), then the UE 120 may multiplex a payload of the HARQ-ACK resource and a payload of the SR resource on the HARQ-ACK resource. The UE 120 may transmit the multiplexed payload using the HARQ-ACK resource.

In some cases, if a HARQ-ACK resource associated with a PUCCH format 0 and a low priority collides with an SR resource associated with a PUCCH format 0 and a high priority, then the UE 120 may multiplex a payload of the HARQ-ACK resource and a payload of the SR resource on the HARQ-ACK resource (option 1 depicted in FIG. 5). The UE 120 may determine a power control parameter (e.g., a closed-loop power control parameter and/or an open-loop power control parameter) for transmitting the HARQ-ACK resource based at least in part on the SR resource (e.g., because the SR resource is associated with a high priority and, therefore, a higher transmit power). In some cases, the UE 120 may determine a power boost value to apply to the HARQ-ACK resource in addition to, or alternatively to, determining the power control parameter based at least in part on the SR resource. The UE 120 may transmit the HARQ-ACK resource (carrying the multiplexed payload) using the power control parameter and/or the power boost value. In some cases, if a HARQ-ACK resource associated with a PUCCH format 0 and a low priority collides with an SR resource associated with a PUCCH format 0 and a high priority, then the UE 120 may multiplex a payload of the HARQ-ACK resource and a payload of the SR resource on the SR resource (option 2 depicted in FIG. 5), regardless of whether the payload of the SR resource indicates a positive SR (e.g., a first state of the SR where the UE requests to be scheduled) or a negative SR (e.g., a second state of the SR where the UE does not request to be scheduled). The UE 120 may determine a transmit power for the SR resource (carrying the multiplexed payload) based at least in part on the SR resource.

In some cases, if a HARQ-ACK resource associated with a PUCCH format 0 and a low priority collides with an SR resource associated with a PUCCH format 1 and a high priority, then the UE 120 may determine whether a payload of the SR resource indicates a positive SR. If the payload of the SR resource indicates a positive SR, then the UE 120 may transmit a payload of the HARQ-ACK resource using the SR resource (e.g., to indicate that the SR resource is associated with a positive SR). If the payload of the SR resource indicates a negative SR, then the UE 120 may transmit a payload of the HARQ-ACK resource using the HARQ-ACK resource (e.g., to indicate that the SR resource is associated with a negative SR). If the UE 120 transmits the payload of the HARQ-ACK resource using the SR resource, then the UE 120 may determine a transmit power (e.g., a power control parameter) for the transmission based at least in part on transmit power associated with the SR resource.

In some cases, if a HARQ-ACK resource associated with a PUCCH format 1 and a low priority collides with an SR resource associated with a PUCCH format 0 and a low priority, then the UE 120 may drop the SR resource. The UE 120 may transmit a payload of the HARQ-ACK resource using the HARQ-ACK resource.

In some cases, if a HARQ-ACK resource associated with a PUCCH format 1 and a low priority collides with an SR resource associated with a PUCCH format 1 and a low priority, then the UE 120 may perform an RB selection procedure to resolve the collision. For example, if a payload of the SR resource indicates a positive SR, the UE 120 may transmit a payload of the HARQ-ACK resource using the SR resource. If the payload of the SR resource indicates a negative SR, the UE 120 may transmit a payload of the HARQ-ACK resource using the HARQ-ACK resource.

In some cases, if a HARQ-ACK resource associated with a PUCCH format 1 and a low priority collides with an SR resource associated with a PUCCH format 0 and a high priority, then the UE 120 may determine whether a payload of the SR resource indicates a positive SR. If the payload of the SR resource indicates a positive SR, then the UE 120 may transmit a payload of the HARQ-ACK resource using the SR resource (e.g., to indicate that the SR resource is associated with a positive SR). If the payload of the SR resource indicates a negative SR, then the UE 120 may transmit a payload of the HARQ-ACK resource using the HARQ-ACK resource (e.g., to indicate that the SR resource is associated with a negative SR). If the UE 120 transmits the payload of the HARQ-ACK resource using the SR resource, then the UE 120 may determine a transmit power (e.g., a power control parameter) for the transmission based at least in part on the transmit power associated with the SR resource.

In some cases, if the HARQ-ACK resource associated with a PUCCH format 1 and a low priority collides with an SR resource associated with a PUCCH format 0 and a high priority, then the UE 120 may drop the SR resource, regardless of whether the payload of the SR resource indicates a positive or negative SR resource (e.g., option 2 depicted in FIG. 5). The UE 120 may transmit the payload of the HARQ-ACK resource using the HARQ-ACK resource.

In some cases, if a HARQ-ACK resource associated with a PUCCH format 1 and a low priority collides with an SR resource associated with a PUCCH format 1 and a high priority, then the UE 120 may perform an RB selection procedure to resolve the collision. For example, if a payload of the SR resource indicates a positive SR, the UE 120 may transmit a payload of the HARQ-ACK resource using the SR resource. If the payload of the SR resource indicates a negative SR, the UE 120 may transmit a payload of the HARQ-ACK resource using the HARQ-ACK resource. The UE 120 may determine a transmit power (e.g., a power control parameter) based at least in part on the resource used (e.g., the HARQ-ACK resource or the SR resource) for the transmission.

In some cases, if a HARQ-ACK resource associated with a PUCCH format 0 and a high priority collides with an SR resource associated with a PUCCH format 0 and a low priority, then the UE 120 may multiplex a payload of the HARQ-ACK resource and a payload of the SR resource on the HARQ-ACK resource. In some cases, the UE 120 may determine a power boost value to apply to the transmission of the HARQ-ACK resource carrying the multiplexed payload. The UE 120 may transmit the multiplexed payload using the HARQ-ACK resource. In some cases, the UE 120 may apply the power boost value to the transmit power of the transmission of the HARQ-ACK resource.

In some cases, if a HARQ-ACK resource associated with a PUCCH format 0 and a high priority collides with an SR resource associated with a PUCCH format 1 and a low priority, then the UE 120 may multiplex a payload of the HARQ-ACK resource and a payload of the SR resource on the HARQ-ACK resource (e.g., option 1 depicted in FIG. 5). In some cases, the UE 120 may determine a power boost value to apply to the transmission of the HARQ-ACK resource carrying the multiplexed payload. The UE 120 may transmit the multiplexed payload using the HARQ-ACK resource. In some cases, the UE 120 may apply the power boost value to the transmit power of the transmission of the HARQ-ACK resource.

In some cases, if a HARQ-ACK resource associated with a PUCCH format 0 and a high priority collides with an SR resource associated with a PUCCH format 1 and a low priority, then the UE 120 may drop the SR resource, regardless of whether the payload of the SR resource indicates a positive or negative SR resource (e.g., option 2 depicted in FIG. 5). The UE 120 may transmit the payload of the HARQ-ACK resource using the HARQ-ACK resource.

In some cases, if a HARQ-ACK resource associated with a PUCCH format 0 and a high priority collides with an SR resource associated with a PUCCH format 0 and a high priority, then the UE 120 may multiplex a payload of the HARQ-ACK resource and a payload of the SR resource on the HARQ-ACK resource. The UE 120 may transmit the multiplexed payload using the HARQ-ACK resource.

In some cases, if a HARQ-ACK resource associated with a PUCCH format 0 and a high priority collides with an SR resource associated with a PUCCH format 1 and a high priority, then the UE 120 may multiplex a payload of the HARQ-ACK resource and a payload of the SR resource on the HARQ-ACK resource. The UE 120 may transmit the multiplexed payload using the HARQ-ACK resource.

In some cases, if a HARQ-ACK resource associated with a PUCCH format 1 and a high priority collides with an SR resource associated with a PUCCH format 0 and a low priority, then the UE 120 may drop the SR resource. The UE 120 may transmit a payload of the HARQ-ACK resource using the HARQ-ACK resource.

In some cases, if a HARQ-ACK resource associated with a PUCCH format 1 and a high priority collides with an SR resource associated with a PUCCH format 1 and a low priority, then the UE 120 may perform an RB selection procedure to resolve the collision. For example, if a payload of the SR resource indicates a positive SR, the UE 120 may transmit a payload of the HARQ-ACK resource using the SR resource. If the payload of the SR resource indicates a negative SR, the UE 120 may transmit a payload of the HARQ-ACK resource using the HARQ-ACK resource. The UE 120 may determine a transmit power (e.g., a power control parameter) based at least in part on the resource used (e.g., the HARQ-ACK resource or the SR resource) for the transmission. In some cases, if the payload of the SR resource indicates a positive SR, the UE 120 may determine a power control parameter (e.g., a closed-loop power control parameter and/or an open-loop power control parameter) for a transmission of the payload of the HARQ-ACK resource on the SR resource based at least in part on the HARQ-ACK resource (e.g., the UE 120 may determine a transmit power for transmitting the SR resource using the transmit power associated with the HARQ-ACK resource). In this way, a transmit power of the low priority SR resource may be based at least in part on the high priority HARQ-ACK resource, thereby increasing a transmit power of the transmission and increasing a reliability of the transmission.

In some cases, if a HARQ-ACK resource associated with a PUCCH format 1 and a high priority collides with an SR resource associated with a PUCCH format 0 and a high priority, then the UE 120 may drop the SR resource. The UE 120 may transmit a payload of the HARQ-ACK resource using the HARQ-ACK resource.

In some cases, if a HARQ-ACK resource associated with a PUCCH format 1 and a high priority collides with an SR resource associated with a PUCCH format 1 and a high priority, then the UE 120 may perform an RB selection procedure to resolve the collision. For example, if a payload of the SR resource indicates a positive SR, the UE 120 may transmit a payload of the HARQ-ACK resource using the SR resource. If the payload of the SR resource indicates a negative SR, the UE 120 may transmit a payload of the HARQ-ACK resource using the HARQ-ACK resource. The UE 120 may determine a transmit power (e.g., a power control parameter) based at least in part on the resource used (e.g., the HARQ-ACK resource or the SR resource) for the transmission.

Although examples above have been described with respect to two priority levels (e.g., high priority and low priority), the examples may similarly apply to a scenario in which the UE 120 is configured with more than two priority levels. In the case where the UE 120 is configured with more than two priority levels, "high priority," as used herein, may refer to a higher priority among the colliding resources. Similarly, "low priority," as used herein, may refer to a lower priority among the colliding resources. As described above, the collision avoidance rules may be different for different priority combinations and/or PUCCH formats, which creates complexity and consumes excess processing resources.

As indicated above, FIG. 5 is provided as an example. Other examples may differ from what is described with respect to FIG. 5.

Figure 6:
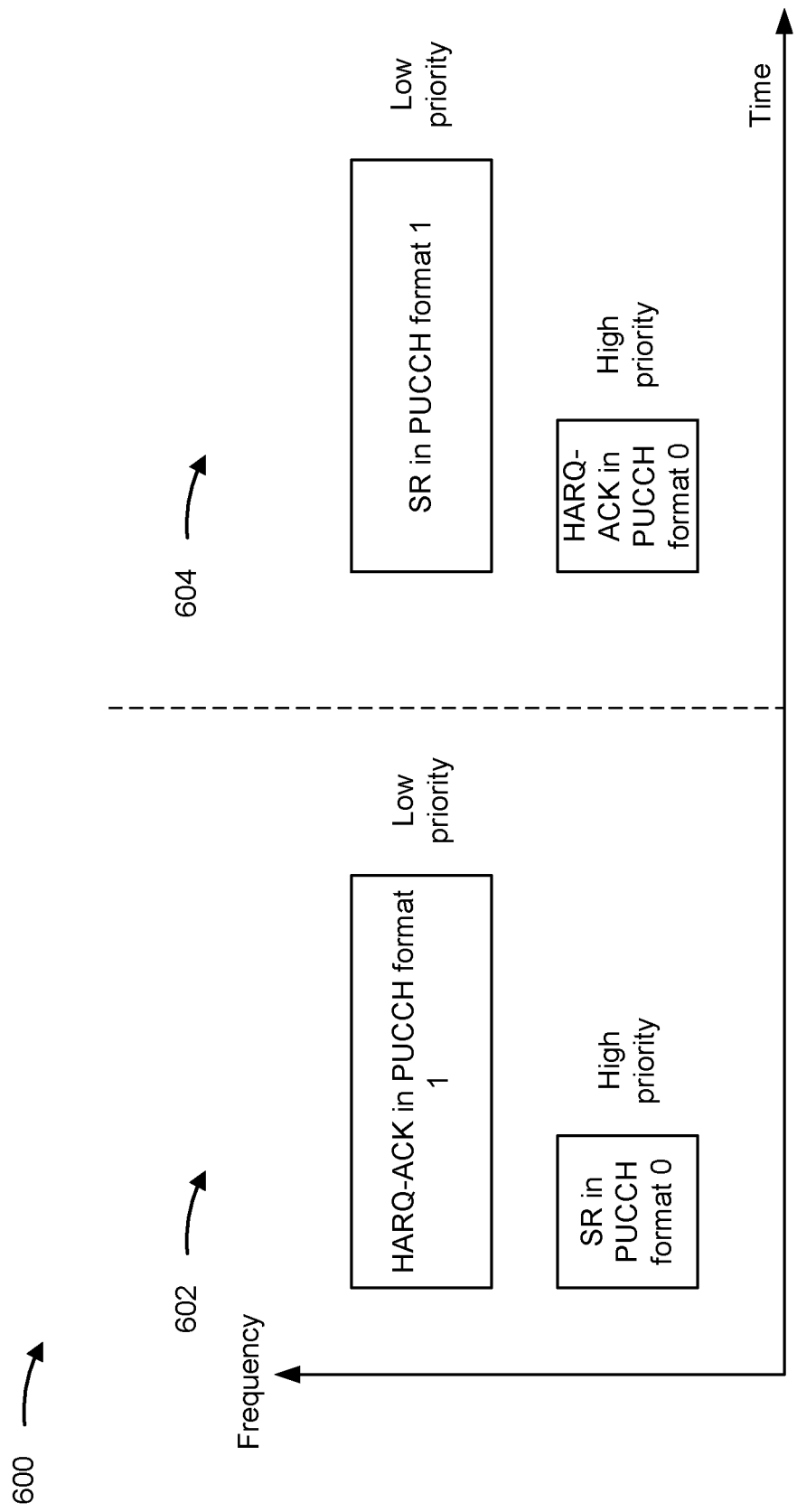
FIG. 6 is a diagram illustrating an example of overlapping HARQ-ACK and SR transmissions, in accordance with the present disclosure.

FIG. 6 is a diagram illustrating an example 600 of overlapping HARQ-ACK and SR transmissions, in accordance with the present disclosure. As shown in the figure, a HARQ-ACK resource having a priority (e.g., high or low)

and a PUCCH format (e.g., 0 or 1) may overlap with an SR resource having a priority (e.g., high or low) and a PUCCH format (e.g., 0 or 1).

As shown by reference number 602, in a first example, a high priority SR of one bit may be scheduled to be transmitted using a PUCCH format 0 (e.g., may be scheduled to be transmitted in a PUCCH resource having PUCCH format 0). The high priority SR may be associated with a first payload, and may be originally scheduled with the PUCCH format 0. A low priority HARQ-ACK of one bit or two bits may be scheduled to be transmitted using a PUCCH format 1. The low priority HARQ-ACK may be associated with a second payload, and may be originally scheduled with the PUCCH format 1. Different priorities of the SR and the HARQ-ACK may be based at least in part on whether the SR and the HARQ-ACK are associated with ultra-reliable low-latency communications (URLLC) or enhanced mobile broadband (eMBB) communications. In some cases, a PUCCH resource associated with the high priority SR scheduled using the PUCCH format 0 may overlap (e.g., in a time domain) with a PUCCH resource associated with the low priority HARQ-ACK scheduled using the PUCCH format 1.

As shown by reference number 604, in a second example, a low priority SR of one bit may be scheduled to be transmitted using a PUCCH format 1. The low priority SR may be associated with a first payload, and may be originally scheduled with the PUCCH format 1. A high priority HARQ-ACK of one bit or two bits may be scheduled to be transmitted using a PUCCH format 0. The high priority HARQ-ACK may be associated with a second payload, and may be originally scheduled with the PUCCH format 0. In some cases, a PUCCH resource associated with the low priority SR scheduled using the PUCCH format 1 may overlap with a PUCCH resource associated with the high priority HARQ-ACK scheduled using the PUCCH format 0.

As described above, the UE may identify a collision (e.g., in the time domain) between a HARQ-ACK transmission and an SR transmissions having different priorities and/or scheduled for transmission using different PUCCH formats. For example, a HARQ-ACK transmission, having a first priority and in a first PUCCH resource associated with a first format, may collide with an SR transmission, having a second priority and in a second PUCCH resource associated with a second format, when the transmission of the HARQ-ACK overlaps (or partially overlaps) in time with the transmission of the SR. In some cases, the UE may be configured with a first set of rules (e.g., the collision avoidance rules) for determining how to resolve the collision. However, the collision avoidance rules may be a large and/or complicated set of rules. For example, each time the UE detects a collision, the UE would need to determine how to resolve the collision based at least in part on the priority and the PUCCH format of the two (or more) overlapping transmissions, such as according to the table described above in connection with FIG. 5. This may require certain storage and processing resources of the UE, and may increase the time it takes for the transmissions to occur on the PUCCH resources, which can result in a delay or an inability to transmit the SR or the HARQ-ACK in a short time frame. The collision avoidance rules may become even more complicated as additional priority levels and/or additional PUCCH formats are considered.

Techniques and apparatuses are described herein enable multiplexing HARQ-ACK and SR transmissions with different priorities and/or physical uplink control channel formats according to a second set of rules (e.g., a unified set of rules). For example, the unified set of rules may be applied to all HARQ-ACK and SR transmissions having any priority and any PUCCH format (e.g., regardless of the priority or PUCCH format). In some aspects, the UE may append one or more bits of an SR, having a first priority and scheduled in a first PUCCH resource associated with a first format, to one of more bits of a HARQ-ACK, having a second priority and scheduled in a second PUCCH resource associated with a second format, to form a multiplexed SR and HARQ-ACK (e.g., based at least in part on detecting a collision between the first PUCCH resource and the second PUCCH resource). The UE may select a PUCCH resource for transmitting the multiplexed SR and HARQ-ACK, from a plurality of high priority PUCCH resources, based at least in part on a payload size of the multiplexed SR and HARQ-ACK. For example, based at least in part on the unified set of rules, the UE may determine to transmit the multiplexed SR and HARQ-ACK using one of a plurality of high priority PUCCH resources. The UE may determine which of the plurality of high priority PUCCH resources on which to transmit the multiplexed SR and HARQ-ACK based at least in part on the payload size of the multiplexed SR and HARQ-ACK. The UE may transmit the multiplexed SR and HARQ-ACK using the selected PUCCH resource.

In some aspects, the unified set of rules may reduce the storage and processing requirements of the UE for resolving resource collisions, and may decrease a transmission time of (e.g., a delay prior to transmission of) the HARQ-ACK and the SR. For example, using the set of collision avoidance rules described above in connection with FIG. 5, each time the UE detects a collision between a HARQ-ACK transmission and an SR transmission, the UE would need to determine how to resolve the collision based at least in part on the priority and the PUCCH format of the overlapping transmissions. Therefore, the UE would need to determine which of the large set of collision avoidance rules to apply. In contrast, the UE configured with the unified set of rules may be able to apply the same rules each time the UE detects a collision.

As indicated above, FIG. 6 is provided as an example. Other examples may differ from what is described with regard to FIG. 6.

Figure 7:
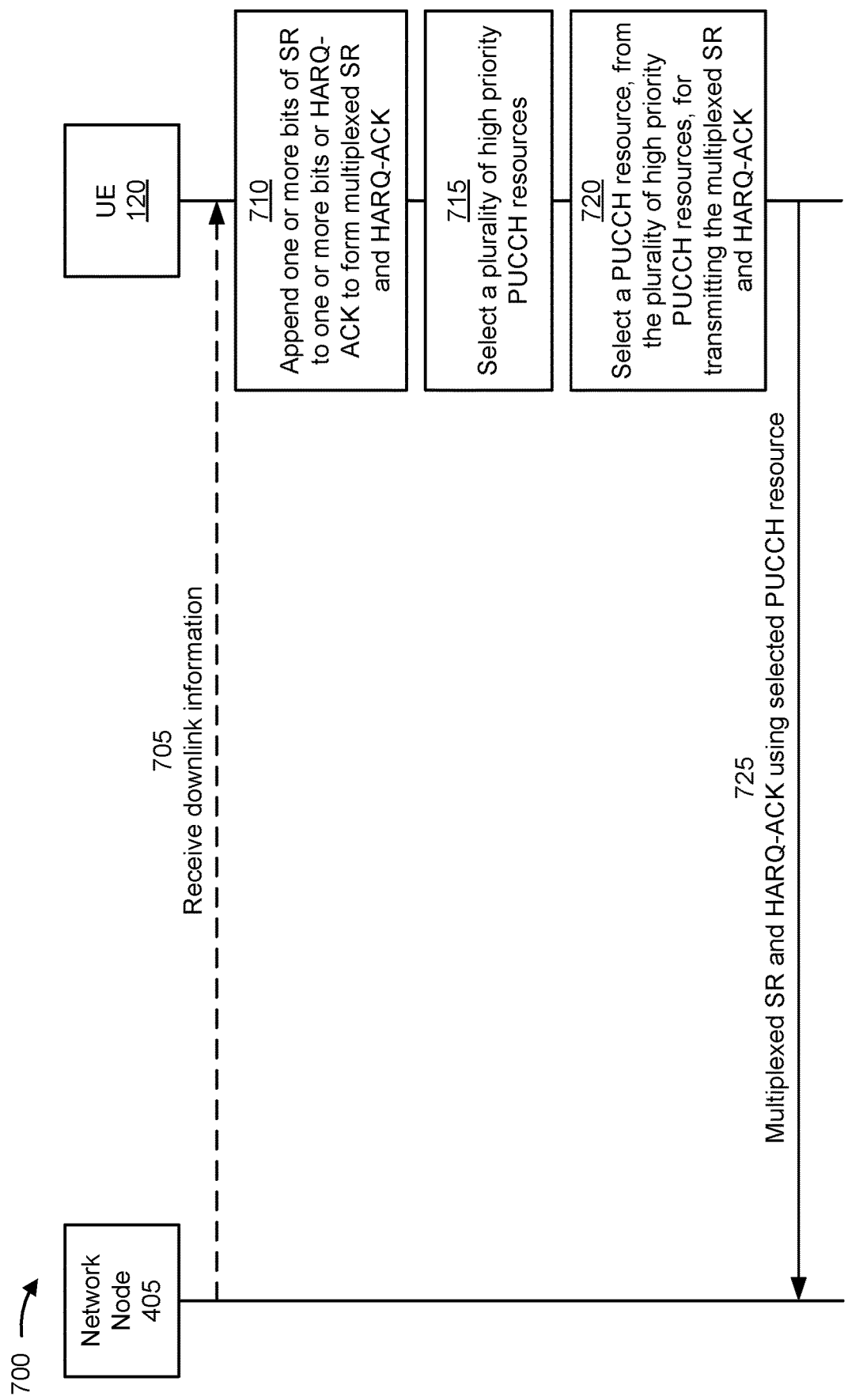
FIG. 7 is a diagram illustrating an example associated with multiplexing HARQ-ACK and SR with different priorities and PUCCH formats, in accordance with the present disclosure.

FIG. 7 is a diagram illustrating an example 700 associated with multiplexing HARQ-ACK and SR with different priorities and PUCCH formats, in accordance with the present disclosure. As shown in the figure, a network node, such as the network node 405, may communicate with a UE, such as the UE 120, for transmitting the multiplexed SR and HARQ-ACK using the selected PUCCH resource.

As shown in connection with reference number 705, the network node 405 may transmit, and the UE 120 may receive, downlink information. The downlink information may indicate a set of rules for resolving the resource collisions. In some aspects, the set of rules may include the set of collision avoidance rules (e.g., described above in connection with FIG. 5). As described above, the set of collision avoidance rules may be a large set of rules, which may require storage and processing resources of the UE 120. Additionally, or alternatively, the set of rules may include the unified set of rules. As described above, the unified set of rules may require less storage and processing resources of the UE 120. In some aspects, the set of collision avoidance rules and/or the unified set of rules may be configured (e.g., pre-configured or stored in memory in accordance with a telecommunication standard) in memory of the UE 120, or may be received from a device other than the network node 405.

As shown in connection with reference number 710, the UE 120 may append one or more bits of SR to one or more bits of HARQ-ACK to form a multiplexed SR and HARQ-ACK. For example, the UE 120 may append one or more bits of an SR, having a first priority and scheduled in a first PUCCH resource associated with a first format (e.g., a first PUCCH format), to one of more bits of a HARQ-ACK, having a second priority and scheduled in a second PUCCH resource associated with a second format (e.g., a second PUCCH format), to form a multiplexed SR and HARQ-ACK. In some aspects, the UE 120 may append the one or more bits of the SR to the one or more bits of the HARQ-ACK by inserting the one or more bits of the SR after an end portion of the one or more bits of the HARQ-ACK. In some aspects, the UE may append the SR bit(s) to the end of the HARQ-ACK bit(s) based at least in part on detecting a collision between the first PUCCH resource and the second PUCCH resource (e.g., based at least in part on detecting that the first PUCCH resource and the second PUCCH resource overlap in time and/or frequency).

In some aspects, the terms "append" or "appending" may mean inserting one or more bits into a location of one or more other bits. For example, appending the one or more bits of the SR to the one or more bits of the HARQ-ACK may include inserting the one or more bits of the SR before the one or more bits of the HARQ-ACK, inserting the one or more bits of the SR after the one or more bits of the HARQ-ACK, or inserting the one or more bits of the SR between two or more bits of the HARQ-ACK. In some aspects, appending the one or more bits of the SR to the one or more bits of the HARQ-ACK may include inserting the one or more bits of the SR into different locations of the HARQ-ACK bits. For example, appending the one or more bits of the SR to the one or more bits of the HARQ-ACK may include inserting a first portion of the one or more bits of the SR into a first location of the HARQ-ACK bits, and inserting a second portion of the one or more bits of the SR after an end portion of the HARQ-ACK bits. In any of these examples, the one or more bits of the SR may be considered to be "appended" to the one or more bits of the HARQ-ACK. Other examples may be considered.

In some aspects, the first priority is one of a high priority or a low priority and the second priority is the other of the high priority or the low priority. For example, the first priority may be a high priority, and the second priority may be a low priority. Alternatively, the first priority may be a low priority, and the second priority may be a high priority.

In some aspects, the first PUCCH format is one of PUCCH format 0 or PUCCH format 1, and the second PUCCH format is the other of PUCCH format 0 or PUCCH format 1. For example, the first PUCCH format may be a PUCCH format 0, and the second PUCCH format may be a PUCCH format 1. Alternatively, the first PUCCH format may be a PUCCH format 1, and the second PUCCH format may be a PUCCH format 0.

In some aspects, the UE 120 may append the one or more bits of the SR to the one or more bits of the HARQ-ACK based at least in part on a rule of the unified set of rules. In some aspects, the UE 120 may append the one or more bits of the SR to the one or more bits of the HARQ-ACK, in accordance with the unified set of rules, regardless of the first PUCCH format and regardless of the second PUCCH format. For example, one or more bits of the SR having a first PUCCH format or a second PUCCH format may be added to an end portion of one or more bits of a HARQ-ACK having a first PUCCH format or a second PUCCH format.

As shown in connection with reference number 715, the UE 120 may identify a plurality of high priority PUCCH resources. In some aspects, each of the PUCCH resources (e.g., the first PUCCH resource and the second PUCCH resource) may be categorized as either a high priority resource or a low priority resource. A rule of the unified set of rules may indicate that the UE 120 should always transmit the multiplexed SR and HARQ-ACK on a high priority PUCCH resource. Thus, the UE 120 may select all of the high priority PUCCH resources, or some of the high priority PUCCH resources, as possible candidate PUCCH resources for transmitting the multiplexed SR and HARQ-ACK.

In some aspects, the rule of the unified set of rules may indicate that the UE 120 should always transmit the multiplexed SR and HARQ-ACK PUCCH on a resource having a priority other than a high priority. For example, a rule of the unified set of rules may indicate that the UE 120 should always transmit the multiplexed SR and HARQ-ACK on a low priority PUCCH resource. In some aspects, the PUCCH resources may be categorized into more than two different types or priorities of resources (e.g., high priority, low priority, and medium priority), and the rule of the unified set of rules may indicate one of the priorities of resources for transmitting the multiplexed SR and HARQ-ACK.

As shown in connection with reference number 720, the UE 120 may select a PUCCH resource, from the plurality of high priority PUCCH resources, for transmitting the multiplexed SR and HARQ-ACK. In some aspects, the UE 120 may select the PUCCH resource based at least in part on a payload size of the multiplexed SR and HARQ-ACK. As described above, the UE 120 may identify all of the high priority PUCCH resources, or some of the high priority PUCCH resources, as possible candidate PUCCH resources for transmitting the multiplexed SR and HARQ-ACK. According to a rule (e.g., another rule) of the unified set of rules, the UE 120 may select a high priority PUCCH resource, of the plurality of high priority PUCCH resources, based at least in part on the payload size of the multiplexed SR and HARQ-ACK. For example, the UE 120 may select a high priority PUCCH resource, of the set of high priority PUCCH resources, if the high priority PUCCH resource is capable of transmitting all of the bits of the multiplexed SR and HARQ-ACK. In some aspects, each of the plurality of high priority PUCCH resources may be able to transmit data having a threshold number of bits. The UE 120 may select a high priority PUCCH resource of the plurality of high priority PUCCH resources based at least in part on a number of bits of the multiplexed SR and HARQ-ACK and based at least in part on a threshold number of bits associated with the high priority PUCCH resource. For example, if the number of bits of the multiplexed SR and HARQ-ACK is less than, or equal to, the threshold number of bits associated with the high priority PUCCH resource, the multiplexed SR and HARQ-ACK may be transmitted on the high priority PUCCH resource. Alternatively, if the number of bits of the multiplexed SR and HARQ-ACK is greater than the threshold number of bits associated with the high priority PUCCH resource, the multiplexed SR and HARQ-ACK may not be transmitted on the high priority PUCCH resource.

In some aspects, selecting a high priority PUCCH resource, of the plurality of high priority PUCCH resources, may include selecting a single, high priority PUCCH resource for transmitting the multiplexed SR and HARQ-ACK. In this case, the UE 120 may transmit the multiplexed SR and HARQ-ACK on the selected high priority PUCCH resource. In some aspects, selecting a high priority PUCCH resource, of the plurality of high priority PUCCH resources, may include selecting a number of high priority PUCCH resources (e.g., more than one high priority PUCCH resource). The number of high priority PUCCH resources may be a subset of the plurality of the high priority PUCCH resources. In this case, the UE 120 may select a high priority PUCCH resource, from the subset of high priority PUCCH resources, for transmitting the multiplexed SR and HARQ-ACK.

In some aspects, the UE 120 may transmit the multiplexed SR and HARQ-ACK dynamically. For example, the UE 120 may schedule a transmission of the multiplexed SR and HARQ-ACK based at least in part on downlink control information (DCI). The DCI may indicate a PUCCH resource (e.g., the second PUCCH resource) in which the HARQ-ACK is to be transmitted. In this case, the UE 120 may select the high priority PUCCH for transmitting the multiplexed SR and HARQ-ACK based at least in part on one or more dynamic selection rules.

In some aspects, the one or more dynamic selection rules may include one or more of the following rules. A first rule may indicate that the UE 120 is to select high priority PUCCH resources or low priority PUCCH resources based at least in part on determining whether the UCI payload is high priority or low priority. A second rule may indicate that the UE 120 is to select a subset of the high priority PUCCH resources or a subset of the low priority PUCCH resources based at least in part on the dynamic HARQ-ACK payload size. A third rule may indicate that the UE 120 is to select a particular resource of the subset of the high priority PUCCH resources or the subset of the low priority PUCCH resources based at least in part on a PUCCH resource indicator (PRI field) included in the scheduling DCI (e.g., that schedules the HARQ-ACK and/or the SR). In some aspects, according to a dynamic selection rule, the UE 120 may select a high priority PUCCH resource or a low priority PUCCH resource based at least in part on determining whether the UCI payload is high priority or low priority, may select a subset of the high priority PUCCH resources or a subset of the low priority PUCCH resources based at least in part on the dynamic HARQ-ACK payload size, and may select a particular resource of the subset of the high priority PUCCH resources or the subset of the low priority PUCCH resources based at least in part on a PUCCH resource indicator (PRI field) included in the scheduling DCI (e.g., that schedules the HARQ-ACK and/or the SR)

In some aspects, the UE 120 may transmit the multiplexed SR and HARQ-ACK periodically (e.g., according to an SPS configuration). For example, the UE 120 may schedule one or more transmissions of the multiplexed SR and HARQ-ACK based at least in part on a radio resource control (RRC) message. In this case, the UE 120 may select the high priority PUCCH for transmitting the multiplexed SR and HARQ-ACK based at least in part on one or more periodic selection rules.

In some aspects, the one or more periodic selection rules may include one or more of the following rules. A first rule may indicate that the UE 120 is to select high priority PUCCH resources or low priority PUCCH resources based at least in part on determining whether the UCI payload is high priority or low priority. A second rule may indicate that the UE 120 is to select a particular PUCCH resource, from the selected high priority PUCCH resources or low priority PUCCH resources, based at least in part on the periodic HARQ-ACK payload size. In some aspects, according to a periodic selection rule, the UE 120 may select high priority PUCCH resources or low priority PUCCH resources based at least in part on determining whether the UCI payload is high priority or low priority, and may select a particular PUCCH resource, from the selected high priority PUCCH resources or low priority PUCCH resources, based at least in part on the periodic HARQ-ACK payload size.

As described above, the UE 120 may select, from a plurality of high priority PUCCH resources and/or a plurality of low priority PUCCH resources, the high priority PUCCH resources as possible candidate PUCCH resources for transmitting the multiplexed SR and HARQ-ACK. The UE 120 may further select a set of one or more high priority PUCCH resources, from the plurality of high priority PUCCH resources, based at least in part on the payload size of the multiplexed SR and HARQ-ACK. The UE 120 may even further select, from the set of one or more high priority PUCCH resources, a single high priority PUCCH resource for transmitting the multiplexed SR and HARQ-ACK based at least in part on one or more dynamic selection rules (if the multiplexed SR and HARQ-ACK is being transmitted dynamically) or one or more periodic selection rules (if the multiplexed SR and HARQ-ACK is being transmitted periodically).

As shown in connection with reference number 725, the UE 120 may transmit, and the network node 405 may receive, the multiplexed SR and HARQ-ACK using the selected resource. In some aspects, the UE 120 may transmit the multiplexed SR and HARQ-ACK in accordance with a PUCCH format of the selected PUCCH resource. In some aspects, the network node 405 may receive or decode the multiplexed SR and HARQ-ACK using the PUCCH format associated with the PUCCH resource on which the multiplexed SR and HARQ-ACK is received by the network node 405 regardless of the PUCCH formats originally scheduled for the SR and the HARQ-ACK.

As described above, the UE 120, using the set of collision avoidance rules, would need to determine which of the large set of collision avoidance rules to apply each time the UE 120 detects a collision between a HARQ-ACK transmission and an SR transmission. In contrast, the UE configured with the unified set of rules may be able to apply the same rules each time the UE detects a collision, regardless of the priority or the PUCCH format of the HARQ-ACK and the SR. Thus, processing resources of the UE 120 may be reduced, and transmission times may be improved.

As indicated above, FIG. 7 is provided as an example. Other examples may differ from what is described with respect to FIG. 7.

Figure 8:
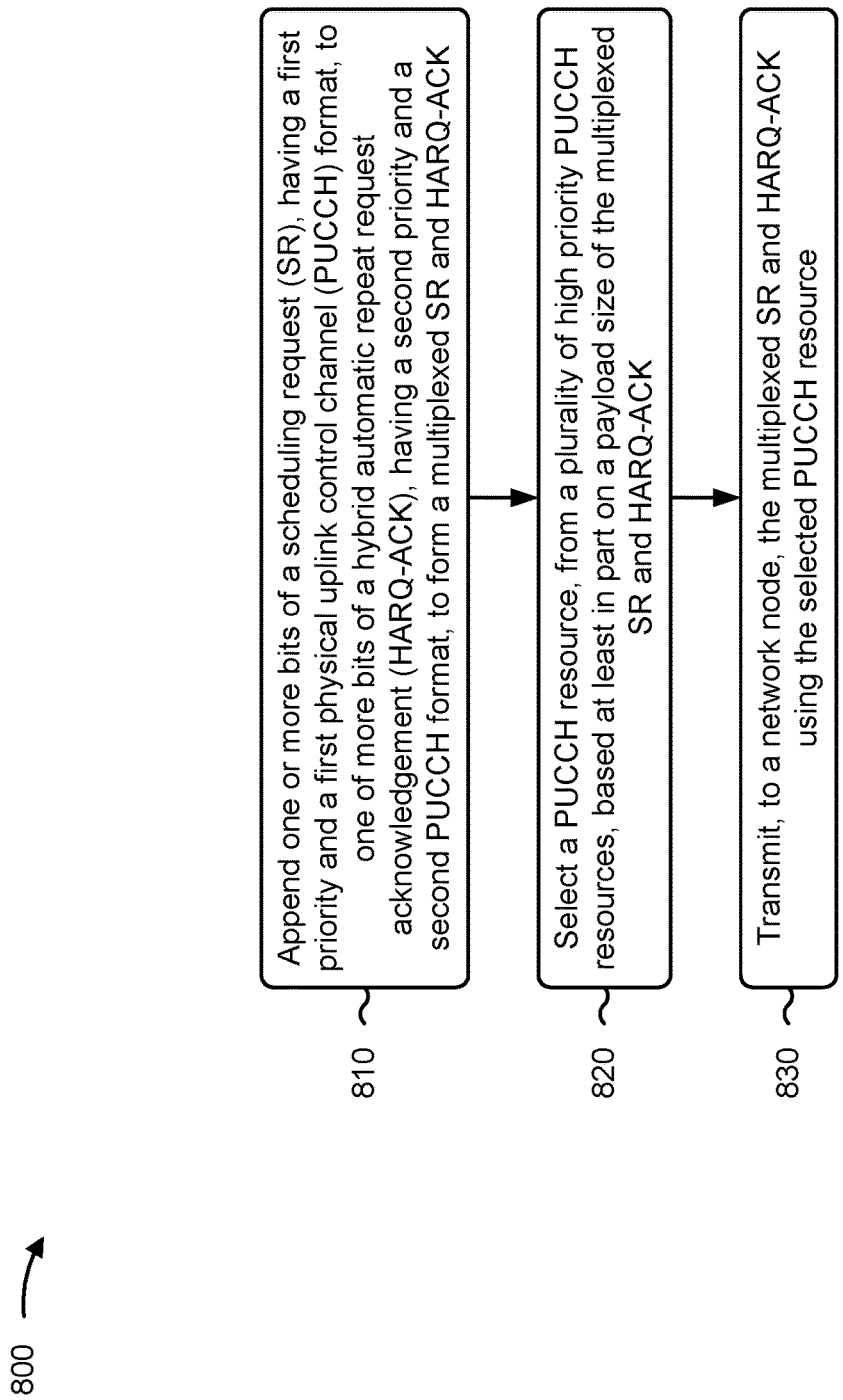
FIG. 8 is a diagram illustrating an example process associated with multiplexing HARQ-ACK and SR with different priorities and PUCCH formats, in accordance with the present disclosure.

FIG. 8 is a diagram illustrating an example process 800 performed, for example, by a UE, in accordance with the present disclosure. Example process 800 is an example where the UE (e.g., UE 120) performs operations associated with multiplexing hybrid automatic repeat request acknowledgement and scheduling request with different priorities and physical uplink control channel formats.

As shown in FIG. 8, in some aspects, process 800 may include appending one or more bits of a scheduling request (SR), having a first priority and in a first physical uplink control channel (PUCCH) resource associated with a first format, to one of more bits of a hybrid automatic repeat request acknowledgement (HARQ-ACK), having a second priority and in a second PUCCH resource associated with a second format, to form a multiplexed SR and HARQ-ACK (block 810). For example, the UE (e.g., using communication manager 140 and/or multiplexing component 1008, depicted in FIG. 10) may append one or more bits of a scheduling request (SR), having a first priority and in a first physical uplink control channel (PUCCH) resource (e.g., scheduled in the first PUCCH resource) associated with a first format, to one of more bits of a hybrid automatic repeat request acknowledgement (HARQ-ACK), having a second priority and in a second PUCCH resource (e.g., scheduled in the second PUCCH resource) associated with a second format, to form a multiplexed SR and HARQ-ACK, as described above.

As further shown in FIG. 8, in some aspects, process 800 may include selecting a PUCCH resource, from a plurality of high priority PUCCH resources, based at least in part on a payload size of the multiplexed SR and HARQ-ACK (block 820). For example, the UE (e.g., using communication manager 140 and/or selection component 1010, depicted in FIG. 10) may select a PUCCH resource, from a plurality of high priority PUCCH resources, based at least in part on a payload size of the multiplexed SR and HARQ-ACK, as described above.

As further shown in FIG. 8, in some aspects, process 800 may include transmitting, to a network node, the multiplexed SR and HARQ-ACK using the selected PUCCH resource (block 830). For example, the UE (e.g., using communication manager 140 and/or transmission component 1004, depicted in FIG. 10) may transmit, to a network node, the multiplexed SR and HARQ-ACK using the selected PUCCH resource, as described above.

Process 800 may include additional aspects, such as any single aspect or any combination of aspects described below and/or in connection with one or more other processes described elsewhere herein.

In a first aspect, appending the one or more bits of the SR to the one or more bits of the HARQ-ACK comprises appending the one or more bits of the SR to the one or more bits of the HARQ-ACK regardless of the first PUCCH format and regardless of the second PUCCH format.

In a second aspect, alone or in combination with the first aspect, selecting the PUCCH resource comprises selecting the PUCCH resource according to one or more dynamic selection rules based at least in part on the HARQ-ACK being dynamic HARQ-ACK.

In a third aspect, alone or in combination with one or more of the first and second aspects, selecting the PUCCH resource comprises selecting the PUCCH resource based at least in part on a PUCCH resource indicator indicated in scheduling downlink control information.

In a fourth aspect, alone or in combination with one or more of the first through third aspects, selecting the PUCCH resource comprises selecting the PUCCH resource according to one or more periodic selection rules based at least in part on the HARQ-ACK being HARQ-ACK for SPS PDSCH.

In a fifth aspect, alone or in combination with one or more of the first through fourth aspects, transmitting the multiplexed SR and HARQ-ACK comprises transmitting the multiplexed SR and HARQ-ACK in accordance with a PUCCH format of the selected PUCCH resource.

In a sixth aspect, alone or in combination with one or more of the first through fifth aspects, the first priority is one of a high priority or a low priority and the second priority is the other of a high priority or a low priority.

In a seventh aspect, alone or in combination with one or more of the first through sixth aspects, the first PUCCH format is one of PUCCH format 0 or PUCCH format 1, and the second PUCCH format is the other of PUCCH format 0 or PUCCH format 1.

In an eighth aspect, alone or in combination with one or more of the first through seventh aspects, appending the one or more bits of the SR to the one or more bits of the HARQ-ACK comprises inserting the one or more bits of the SR after an end portion of the one or more bits of the HARQ-ACK.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
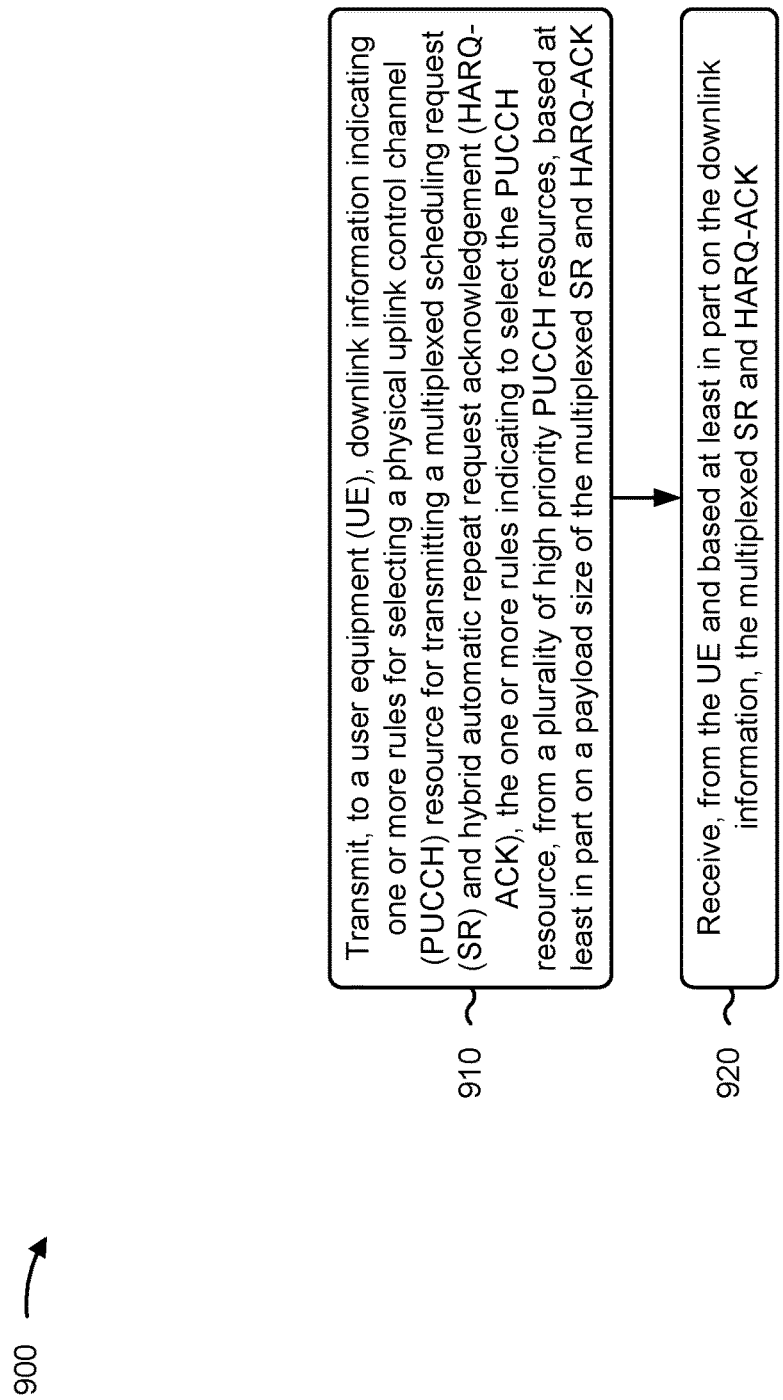
FIG. 9 is a diagram illustrating an example process associated with multiplexing HARQ-ACK and SR with different priorities and PUCCH formats, in accordance with the present disclosure.

FIG. 9 is a diagram illustrating an example process 900 performed, for example, by a network node, in accordance with the present disclosure. Example process 900 is an example where the network node (e.g., base station 110) performs operations associated with multiplexing HARQ-ACK and SR with different priorities and PUCCH formats.

As shown in FIG. 9, in some aspects, process 900 may include transmitting, to a user equipment (UE), downlink information indicating one or more rules for selecting a physical uplink control channel (PUCCH) resource for transmitting a multiplexed scheduling request (SR) and hybrid automatic repeat request acknowledgement (HARQ-ACK), the one or more rules indicating to select the PUCCH resource, from a plurality of high priority PUCCH resources, based at least in part on a payload size of the multiplexed SR and HARQ-ACK (block 910). For example, the network node (e.g., using communication manager 150 and/or transmission component 1104, depicted in FIG. 11) may transmit, to a user equipment (UE), downlink information indicating one or more rules for selecting a physical uplink control channel (PUCCH) resource for transmitting a multiplexed scheduling request (SR) and hybrid automatic repeat request acknowledgement (HARQ-ACK), the one or more rules indicating to select the PUCCH resource, from a plurality of high priority PUCCH resources, based at least in part on a payload size of the multiplexed SR and HARQ-ACK, as described above.

As further shown in FIG. 9, in some aspects, process 900 may include receiving, from the UE and based at least in part on the downlink information, the multiplexed SR and HARQ-ACK (block 920). For example, the network node (e.g., using communication manager 150 and/or reception component 1102, depicted in FIG. 11) may receive, from the UE and based at least in part on the downlink information, the multiplexed SR and HARQ-ACK, as described above.

Process 900 may include additional aspects, such as any single aspect or any combination of aspects described below and/or in connection with one or more other processes described elsewhere herein.

In a first aspect, receiving the multiplexed SR and HARQ-ACK comprises receiving the multiplexed SR and HARQ-ACK dynamically and based at least in part on one or more dynamic selection rules.

In a second aspect, alone or in combination with the first aspect, receiving the multiplexed SR and HARQ-ACK comprises receiving the multiplexed SR and HARQ-ACK periodically and based at least in part on one or more periodic selection rules.

In a third aspect, alone or in combination with one or more of the first and second aspects, receiving the multiplexed SR and HARQ-ACK comprises receiving the multiplexed SR and HARQ-ACK in accordance with a PUCCH format of the selected PUCCH resource.

In a fourth aspect, alone or in combination with one or more of the first through third aspects, the multiplexed SR and HARQ-ACK includes one or more bits of an SR having a first priority and in a first PUCCH resource associated with a first format that are appended to one of more bits of a HARQ-ACK having a second priority and in a second PUCCH resource associated with a second format.

In a fifth aspect, alone or in combination with one or more of the first through fourth aspects, the first priority is one of a high priority or a low priority and the second priority is the other of a high priority or a low priority.

In a sixth aspect, alone or in combination with one or more of the first through fifth aspects, the first PUCCH format is one of PUCCH format 0 or PUCCH format 1, and the second PUCCH format is the other of PUCCH format 0 or PUCCH format 1.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
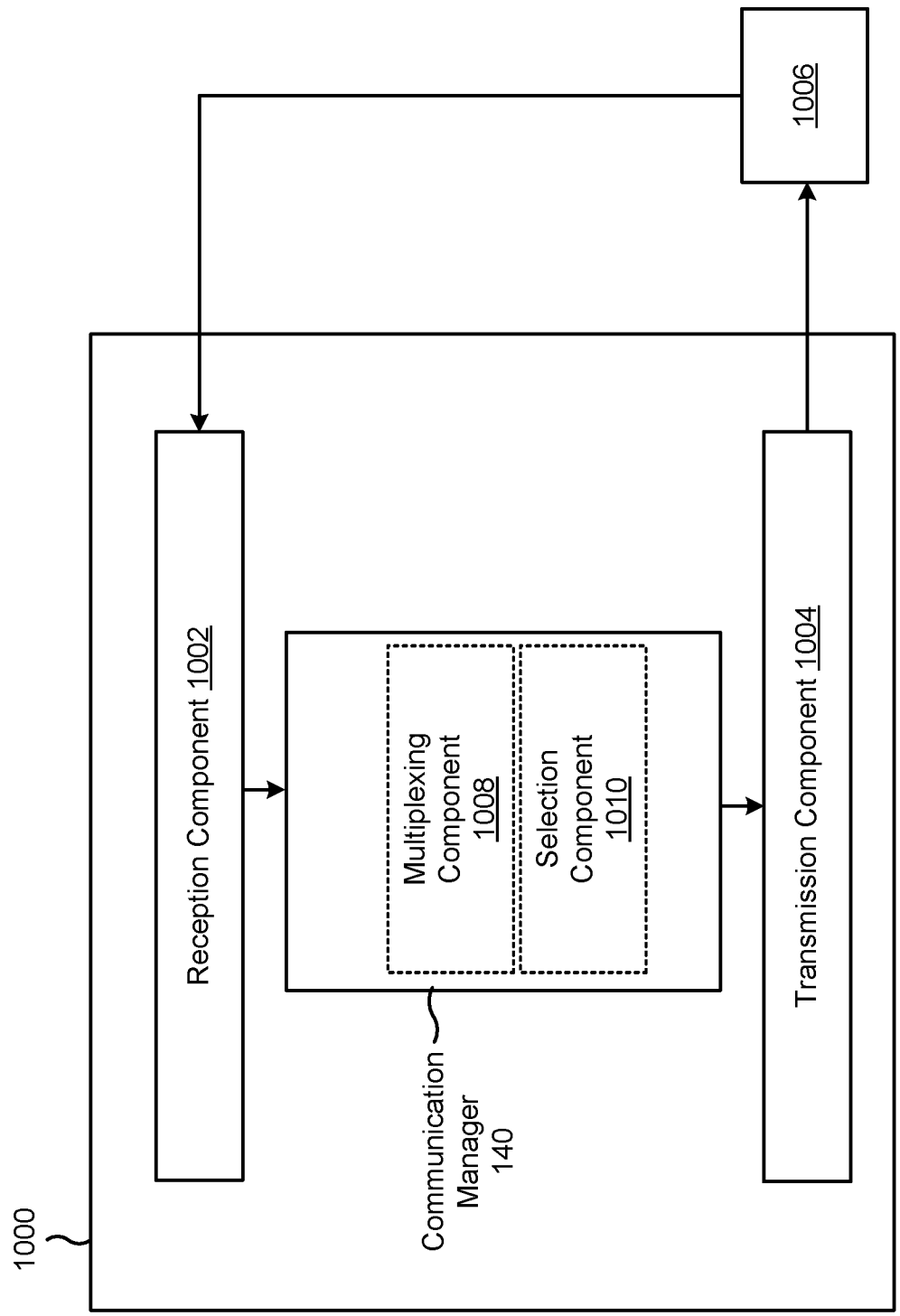
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 140. The communication manager 140 may include one or more of a multiplexing component 1008 or a selection component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The multiplexing component 1008 may append one or more bits of a scheduling request (SR), having a first priority and in a first physical uplink control channel (PUCCH) resource (e.g., scheduled in the first PUCCH resource) associated with a first format, to one of more bits of a hybrid automatic repeat request acknowledgement (HARQ-ACK), having a second priority and in a second PUCCH resource (e.g., scheduled in the second PUCCH resource) associated with a second format, to form a multiplexed SR and HARQ-ACK. The selection component 1010 may select a PUCCH resource, from a plurality of high priority PUCCH resources, based at least in part on a payload size of the multiplexed SR and HARQ-ACK. The transmission component 1004 may transmit, to a network node, the multiplexed SR and HARQ-ACK using the selected PUCCH resource.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
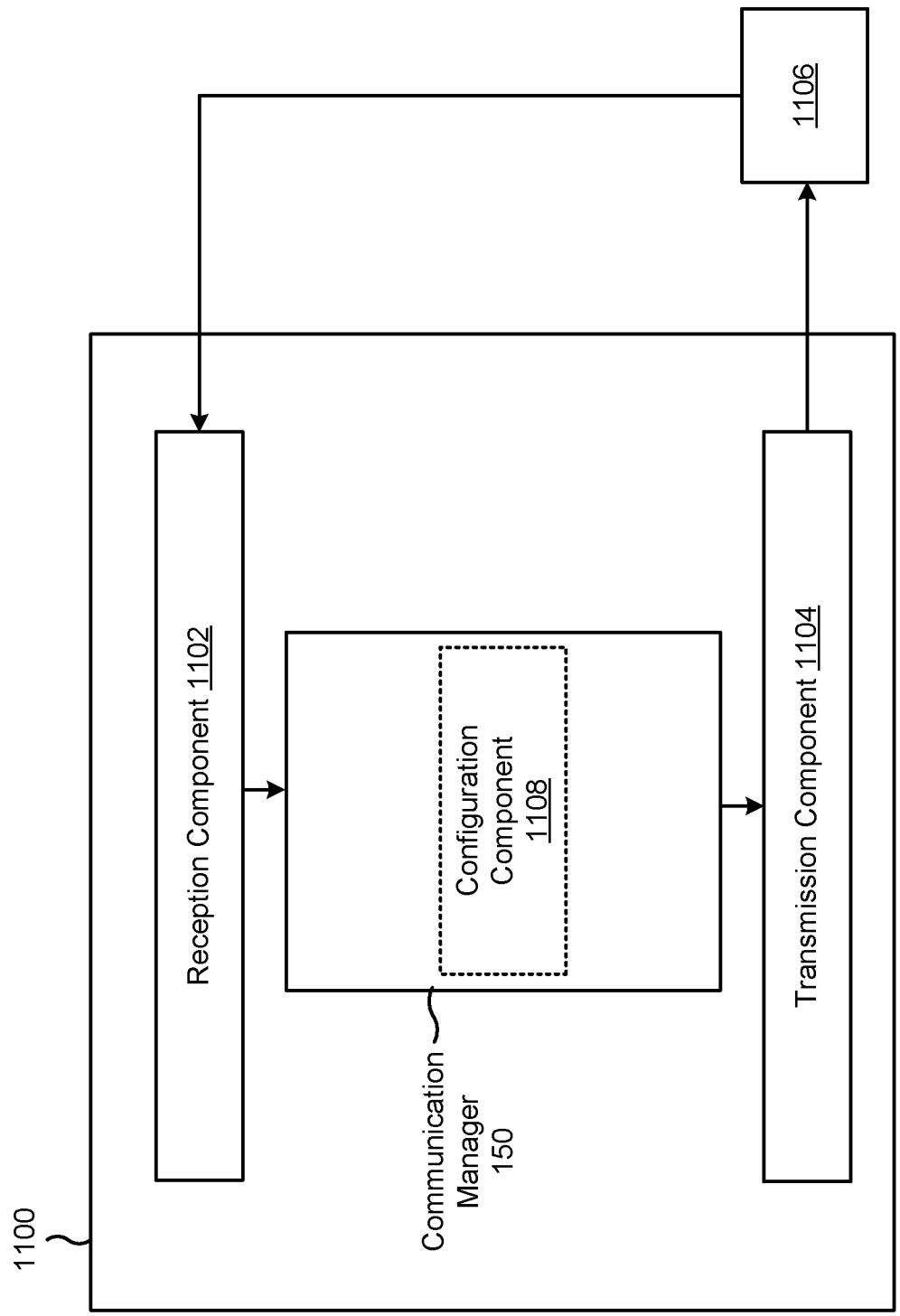
FIG. 11 is a diagram of an example apparatus for wireless communication, in accordance with the present disclosure.

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network node, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a user equipment (UE), downlink information indicating one or more rules for selecting a physical uplink control channel (PUCCH) resource for transmitting a multiplexed scheduling request (SR) and hybrid automatic repeat request acknowledgement (HARQ-ACK), the one or more rules indicating to select the PUCCH resource, from a plurality of high priority PUCCH resources, based at least in part on a payload size of the multiplexed SR and HARQ-ACK. The reception component 1102 may receive, from the UE and based at least in part on the downlink information, the multiplexed SR and HARQ-ACK.

The configuration component 1108 may transmit configuration information, such as configuration information associated with the set of collision avoidance rules and/or the unified set of rules, or the like.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: appending one or more bits of a scheduling request (SR), having a first priority and in a first physical uplink control channel (PUCCH) resource associated with a first format, to one of more bits of a hybrid automatic repeat request acknowledgement (HARQ-ACK), having a second priority and in a second PUCCH resource associated with a second format, to form a multiplexed SR and HARQ-ACK; selecting a PUCCH resource, from a plurality of high priority PUCCH resources, based at least in part on a payload size of the multiplexed SR and HARQ-ACK; and transmitting, to a network node, the multiplexed SR and HARQ-ACK using the selected PUCCH resource.

Aspect 2: The method of Aspect 1, wherein appending the one or more bits of the SR to the one or more bits of the HARQ-ACK comprises appending the one or more bits of the SR to the one or more bits of the HARQ-ACK regardless of the first PUCCH format and regardless of the second PUCCH format.

Aspect 3: The method of any of Aspects 1-2, wherein selecting the PUCCH resource comprises: selecting the PUCCH resource according to one or more dynamic selection rules based at least in part on the HARQ-ACK being dynamic HARQ-ACK.

Aspect 4: The method of Aspect 3, wherein selecting the PUCCH resource comprises: selecting the PUCCH resource based at least in part on a PUCCH resource indicator indicated in scheduling downlink control information.

Aspect 5: The method of any of Aspects 1-2, wherein selecting the PUCCH resource comprises: selecting the PUCCH resource according to one or more periodic selection rules based at least in part on the HARQ-ACK being HARQ-ACK for SPS PDSCH.

Aspect 6: The method of any of Aspects 1-5, wherein transmitting the multiplexed SR and HARQ-ACK comprises: transmitting the multiplexed SR and HARQ-ACK in accordance with a PUCCH format of the selected PUCCH resource.

Aspect 7: The method of any of Aspects 1-6, wherein the first priority is one of a high priority or a low priority and the second priority is the other of a high priority or a low priority.

Aspect 8: The method of any of Aspects 1-7, wherein the first PUCCH format is one of PUCCH format 0 or PUCCH format 1, and the second PUCCH format is the other of PUCCH format 0 or PUCCH format 1.

Aspect 9: The method of any of Aspects 1-8, wherein appending the one or more bits of the SR to the one or more bits of the HARQ-ACK comprises inserting the one or more bits of the SR after an end portion of the one or more bits of the HARQ-ACK.

Aspect 10: The method of any of Aspects 1-8, wherein appending the one or more bits of the SR to the one or more bits of the HARQ-ACK comprises inserting the one or more bits of the SR at a beginning portion of the one or more bits of the HARQ-ACK.

Aspect 11: The method of any of Aspects 1-8, wherein appending the one or more bits of the SR to the one or more bits of the HARQ-ACK comprises inserting the one or more bits of the SR into any location of the one or more bits of the HARQ-ACK.

Aspect 12: The method of any of claims 1-8, wherein appending the one or more bits of the SR to the one or more bits of the HARQ-ACK comprises inserting a first portion of the one or more bits of the SR into a first location of the one or more bits of the HARQ-ACK, and inserting a second portion of the one or more bits of the SR into a second location of the one or more bits of the HARQ-ACK.

Aspect 13: A method of wireless communication performed by a network node, comprising: transmitting, to a user equipment (UE), downlink information indicating one or more rules for selecting a physical uplink control channel (PUCCH) resource for transmitting a multiplexed scheduling request (SR) and hybrid automatic repeat request acknowledgement (HARQ-ACK), the one or more rules indicating to select the PUCCH resource, from a plurality of high priority PUCCH resources, based at least in part on a payload size of the multiplexed SR and HARQ-ACK; and receiving, from the UE and based at least in part on the downlink information, the multiplexed SR and HARQ-ACK.

Aspect 14: The method of Aspect 13, wherein receiving the multiplexed SR and HARQ-ACK comprises: receiving the multiplexed SR and HARQ-ACK dynamically and based at least in part on one or more dynamic selection rules.

Aspect 15: The method of Aspect 13, wherein receiving the multiplexed SR and HARQ-ACK comprises: receiving the multiplexed SR and HARQ-ACK periodically and based at least in part on one or more periodic selection rules.

Aspect 16: The method of any of Aspects 13-15, wherein receiving the multiplexed SR and HARQ-ACK comprises: receiving the multiplexed SR and HARQ-ACK in accordance with a PUCCH format of the selected PUCCH resource.

Aspect 17: The method of any of Aspects 13-16, wherein the multiplexed SR and HARQ-ACK includes one or more bits of an SR having a first priority and in a first PUCCH resource associated with a first format that are appended to one of more bits of a HARQ-ACK having a second priority and in a second PUCCH resource associated with a second format.

Aspect 18: The method of any of Aspects 13-17, wherein the first priority is one of a high priority or a low priority and the second priority is the other of a high priority or a low priority.

Aspect 19: The method of any of Aspects 13-18, wherein the first PUCCH format is one of PUCCH format 0 or PUCCH format 1, and the second PUCCH format is the other of PUCCH format 0 or PUCCH format 1.

Aspect 20: An apparatus for wireless communication at a device, comprising a processor; memory coupled with the processor; and instructions stored in the memory and executable by the processor to cause the apparatus to perform the method of one or more of Aspects 1-12.

Aspect 21: A device for wireless communication, comprising a memory and one or more processors coupled to the memory, the one or more processors configured to perform the method of one or more of Aspects 1-12.

Aspect 22: An apparatus for wireless communication, comprising at least one means for performing the method of one or more of Aspects 1-12.

Aspect 23: A non-transitory computer-readable medium storing code for wireless communication, the code comprising instructions executable by a processor to perform the method of one or more of Aspects 1-12.

Aspect 24: A non-transitory computer-readable medium storing a set of instructions for wireless communication, the set of instructions comprising one or more instructions that, when executed by one or more processors of a device, cause the device to perform the method of one or more of Aspects 1-12.

Aspect 25: An apparatus for wireless communication at a device, comprising a processor; memory coupled with the processor; and instructions stored in the memory and executable by the processor to cause the apparatus to perform the method of one or more of Aspects 13-19.

Aspect 26: A device for wireless communication, comprising a memory and one or more processors coupled to the memory, the one or more processors configured to perform the method of one or more of Aspects 13-19.

Aspect 27: An apparatus for wireless communication, comprising at least one means for performing the method of one or more of Aspects 13-19.

Aspect 28: A non-transitory computer-readable medium storing code for wireless communication, the code comprising instructions executable by a processor to perform the method of one or more of Aspects 13-19.

Aspect 29: A non-transitory computer-readable medium storing a set of instructions for wireless communication, the set of instructions comprising one or more instructions that, when executed by one or more processors of a device, cause the device to perform the method of one or more of Aspects 13-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      append one or more bits of a scheduling request (SR), having a first priority and in a first physical uplink control channel (PUCCH) resource associated with a first format, to one or more bits of a hybrid automatic repeat request acknowledgement (HARQ-ACK), having a second priority and in a second PUCCH resource associated with a second format, to form a multiplexed SR and HARQ-ACK, wherein the multiplexed SR and HARQ-ACK are multiplexed according to a unified set of rules applied to all HARQ-ACK and SR transmissions having any priority and any PUCCH format;
      select a PUCCH resource, from a plurality of high priority PUCCH resources, based at least in part on a payload size of the multiplexed SR and HARQ-ACK; and
      transmit, to a network node, the multiplexed SR and HARQ-ACK using the selected PUCCH resource.

2. The apparatus of claim 1, wherein the one or more processors, to append the one or more bits of the SR to the one or more bits of the HARQ-ACK, are configured to:
   append the one or more bits of the SR to the one or more bits of the HARQ-ACK regardless of the first format and regardless of the second format.

3. The apparatus of claim 1, wherein the one or more processors, to select the PUCCH resource, are configured to:
   select the PUCCH resource according to one or more dynamic selection rules based at least in part on the HARQ-ACK being dynamic HARQ-ACK.

4. The apparatus of claim 3, wherein the one or more processors, to select the PUCCH resource, are configured to:
   select the PUCCH resource based at least in part on a PUCCH resource indicator indicated in scheduling downlink control information.

5. The apparatus of claim 1, wherein the one or more processors, to select the PUCCH resource, are configured to:
   select the PUCCH resource according to one or more periodic selection rules based at least in part on the HARQ-ACK being HARQ-ACK for semi-persistent scheduling physical downlink shared channel communications.

6. The apparatus of claim 1, wherein the one or more processors, to transmit the multiplexed SR and HARQ-ACK, are configured to:
   transmit the multiplexed SR and HARQ-ACK in accordance with a PUCCH format of the selected PUCCH resource.

7. The apparatus of claim 1, wherein the first priority is one of a high priority or a low priority and the second priority is the other of the high priority or the low priority.

8. The apparatus of claim 1, wherein the first format is one of PUCCH format 0 or PUCCH format 1, and the second format is the other of the PUCCH format 0 or the PUCCH format 1.

9. The apparatus of claim 1, wherein the one or more processors, to append the one or more bits of the SR to the one or more bits of the HARQ-ACK, are configured to add the one or more bits of the SR after an end portion of the one or more bits of the HARQ-ACK.

10. A method of wireless communication performed by a user equipment (UE), comprising:
   appending one or more bits of a scheduling request (SR), having a first priority and in a first physical uplink control channel (PUCCH) resource associated with a first format, to one or more bits of a hybrid automatic repeat request acknowledgement (HARQ-ACK), having a second priority and in a second PUCCH resource associated with a second format, to form a multiplexed SR and HARQ-ACK, wherein the multiplexed SR and HARQ-ACK are multiplexed according to a unified set of rules applied to all HARQ-ACK and SR transmissions having any priority and any PUCCH format;
   selecting a PUCCH resource, from a plurality of high priority PUCCH resources, based at least in part on a payload size of the multiplexed SR and HARQ-ACK; and
   transmitting, to a network node, the multiplexed SR and HARQ-ACK using the selected PUCCH resource.

11. The method of claim 10, wherein appending the one or more bits of the SR to the one or more bits of the HARQ-ACK comprises appending the one or more bits of the SR to the one or more bits of the HARQ-ACK regardless of the first format and regardless of the second format.

12. The method of claim 10, wherein selecting the PUCCH resource comprises:
   selecting the PUCCH resource according to one or more dynamic selection rules based at least in part on the HARQ-ACK being dynamic HARQ-ACK.

13. The method of claim 12, wherein selecting the PUCCH resource comprises:
selecting the PUCCH resource based at least in part on a PUCCH resource indicator indicated in scheduling downlink control information.

14. The method of claim 10, wherein selecting the PUCCH resource comprises:
selecting the PUCCH resource according to one or more periodic selection rules based at least in part on the HARQ-ACK being HARQ-ACK for semi-persistent scheduling physical downlink shared channel communications.

15. The method of claim 10, wherein transmitting the multiplexed SR and HARQ-ACK comprises:
transmitting the multiplexed SR and HARQ-ACK in accordance with a PUCCH format of the selected PUCCH resource.

16. The method of claim 10, wherein the first priority is one of a high priority or a low priority and the second priority is the other of the high priority or the low priority.

17. The method of claim 10, wherein appending the one or more bits of the SR to the one or more bits of the HARQ-ACK comprises inserting the one or more bits of the SR after an end portion of the one or more bits of the HARQ-ACK.

18. A non-transitory computer-readable medium storing a set of instructions for wireless communication, the set of instructions comprising:
one or more instructions that, when executed by one or more processors of a user equipment, cause the user equipment to:
append one or more bits of a scheduling request (SR), having a first priority and in a first physical uplink control channel (PUCCH) resource associated with a first format, to one or more bits of a hybrid automatic repeat request acknowledgement (HARQ-ACK), having a second priority and in a second PUCCH resource associated with a second format, to form a multiplexed SR and HARQ-ACK, wherein the multiplexed SR and HARQ-ACK are multiplexed according to a unified set of rules applied to all HARQ-ACK and SR transmissions having any priority and any PUCCH format;
select a PUCCH resource, from a plurality of high priority PUCCH resources, based at least in part on a payload size of the multiplexed SR and HARQ-ACK; and
transmit, to a network node, the multiplexed SR and HARQ-ACK using the selected PUCCH resource.

19. The non-transitory computer-readable medium of claim 18, wherein the one or more instructions, that cause the user equipment to append the one or more bits of the SR to the one or more bits of the HARQ-ACK, cause the user equipment to:
append the one or more bits of the SR to the one or more bits of the HARQ-ACK regardless of the first format and regardless of the second format.

20. The non-transitory computer-readable medium of claim 18, wherein the one or more instructions, that cause the user equipment to select the PUCCH resource, cause the user equipment to:
select the PUCCH resource according to one or more dynamic selection rules based at least in part on the HARQ-ACK being dynamic HARQ-ACK.

21. The non-transitory computer-readable medium of claim 20, wherein the one or more instructions, that cause the user equipment to select the PUCCH resource, cause the user equipment to:
select the PUCCH resource based at least in part on a PUCCH resource indicator indicated in scheduling downlink control information.

22. The non-transitory computer-readable medium of claim 18, wherein the one or more instructions, that cause the user equipment to select the PUCCH resource, cause the user equipment to:
select the PUCCH resource according to one or more periodic selection rules based at least in part on the HARQ-ACK being HARQ-ACK for semi-persistent scheduling physical downlink shared channel communications.

23. The non-transitory computer-readable medium of claim 18, wherein the one or more instructions, that cause the user equipment to transmit the multiplexed SR and HARQ-ACK, cause the user equipment to:
transmit the multiplexed SR and HARQ-ACK in accordance with a PUCCH format of the selected PUCCH resource.

24. The non-transitory computer-readable medium of claim 18, wherein the first priority is one of a high priority or a low priority and the second priority is the other of the high priority or the low priority.

25. The non-transitory computer-readable medium of claim 18, wherein the first format is one of PUCCH format 0 or PUCCH format 1, and the second format is the other of the PUCCH format 0 or the PUCCH format 1.

26. The non-transitory computer-readable medium of claim 18, wherein the one or more instructions, that cause the user equipment to append the one or more bits of the SR to the one or more bits of the HARQ-ACK, cause the user equipment to add the one or more bits of the SR after an end portion of the one or more bits of the HARQ-ACK.

27. An apparatus for wireless communication, comprising:
means for appending one or more bits of a scheduling request (SR), having a first priority and in a first physical uplink control channel (PUCCH) resource associated with a first format, to one or more bits of a hybrid automatic repeat request acknowledgement (HARQ-ACK), having a second priority and in a second PUCCH resource associated with a second format, to form a multiplexed SR and HARQ-ACK, wherein the multiplexed SR and HARQ-ACK are multiplexed according to a unified set of rules applied to all HARQ-ACK and SR transmissions having any priority and any PUCCH format;
means for selecting a PUCCH resource, from a plurality of high priority PUCCH resources, based at least in part on a payload size of the multiplexed SR and HARQ-ACK; and
means for transmitting, to a network node, the multiplexed SR and HARQ-ACK using the selected PUCCH resource.

28. The apparatus of claim 27, wherein the means for appending the one or more bits of the SR to the one or more bits of the HARQ-ACK are configured to:
append the one or more bits of the SR to the one or more bits of the HARQ-ACK regardless of the first format and regardless of the second format.

29. The apparatus of claim 27, wherein the means for selecting the PUCCH resource are configured to:

select the PUCCH resource according to one or more dynamic selection rules based at least in part on the HARQ-ACK being dynamic HARQ-ACK.

30. The apparatus of claim 1, wherein the HARQ-ACK and the SR are scheduled for transmission using different PUCCH formats.

* * * * *